(12) United States Patent
Yang et al.

(10) Patent No.: US 11,445,544 B2
(45) Date of Patent: Sep. 13, 2022

(54) INFORMATION TRANSMISSION METHOD, DEVICE, BASE STATION AND COMPUTER READABLE STORAGE MEDIUM

(71) Applicant: ZTE CORPORATION, Shenzhen (CN)

(72) Inventors: Ling Yang, Shenzhen (CN); Yajun Zhao, Shenzhen (CN); Huaming Wu, Shenzhen (CN); Xincai Li, Shenzhen (CN); Hanging Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 55 days.

(21) Appl. No.: 17/044,413

(22) PCT Filed: Apr. 4, 2019

(86) PCT No.: PCT/CN2019/081590
§ 371 (c)(1),
(2) Date: Oct. 1, 2020

(87) PCT Pub. No.: WO2019/192613
PCT Pub. Date: Oct. 10, 2019

(65) Prior Publication Data
US 2021/0120585 A1    Apr. 22, 2021

(30) Foreign Application Priority Data
Apr. 6, 2018    (CN) .......................... 201810302936.8

(51) Int. Cl.
*H04W 74/08*    (2009.01)
*H04W 76/27*    (2018.01)
(Continued)

(52) U.S. Cl.
CPC ....... *H04W 74/0816* (2013.01); *H04W 16/28* (2013.01); *H04W 56/001* (2013.01);
(Continued)

(58) Field of Classification Search
CPC . H04W 74/0816; H04W 76/27; H04W 16/28; H04W 56/001; H04W 72/005;
(Continued)

(56) References Cited

U.S. PATENT DOCUMENTS

2014/0247820 A1*  9/2014  Jeffery ................ H04B 7/0408
                                                           370/338
2016/0192395 A1*  6/2016  Yoo ....................... H04W 16/14
                                                           370/329
(Continued)

FOREIGN PATENT DOCUMENTS

CN      106576372 A    4/2017
CN      107734682 A    2/2018
(Continued)

OTHER PUBLICATIONS

Nokia et al. "Potential Solutions and Techniques for NR Unlicensed" 3GPP TSG RAN WG1 Meeting #92, R1-1802526, Feb. 16, 2018 (Feb. 16, 2018), pp. 1-10.
(Continued)

*Primary Examiner* — Brenda H Pham
(74) *Attorney, Agent, or Firm* — George McGuire

(57) ABSTRACT

Provided are information transmission method and apparatus, a base station and a computer storage medium. At least one of a time domain position, a frequency domain position or a spatial domain position for transmitting information is determined, where information includes a signal and/or a channel. The information is transmitted at the determined at least one of the time domain position, the frequency domain position or the spatial domain position for transmitting the information. The present disclosure establishes a complete and effective information transmission mechanism. The mechanism is applicable to at least one of a licensed spectrum, an unlicensed spectrum, a shared spectrum, and various available spectra. The solution of the present dis-
(Continued)

closure is particularly applicable to an SSB transmission on the unlicensed carrier.

15 Claims, 13 Drawing Sheets

(51) Int. Cl.
    *H04W 16/28*     (2009.01)
    *H04W 56/00*     (2009.01)
    *H04W 72/00*     (2009.01)
    *H04W 72/04*     (2009.01)
    *H04W 72/08*     (2009.01)
    *H04W 74/00*     (2009.01)
    *H04W 80/02*     (2009.01)

(52) U.S. Cl.
    CPC ....... *H04W 72/005* (2013.01); *H04W 72/042* (2013.01); *H04W 72/046* (2013.01); *H04W 72/0446* (2013.01); *H04W 72/0453* (2013.01); *H04W 72/085* (2013.01); *H04W 74/008* (2013.01); *H04W 76/27* (2018.02); *H04W 80/02* (2013.01)

(58) Field of Classification Search
    CPC ........... H04W 72/042; H04W 72/0446; H04W 72/0453; H04W 72/046; H04W 72/085; H04W 74/008; H04W 80/02
    See application file for complete search history.

(56) References Cited

U.S. PATENT DOCUMENTS

| 2016/0278048 | A1* | 9/2016 | Nory | H04L 1/1887 |
| 2017/0303136 | A1* | 10/2017 | Park | H04B 17/102 |
| 2019/0037481 | A1* | 1/2019 | Zhang | H04L 27/26 |
| 2020/0413359 | A1* | 12/2020 | Li | H04L 5/0094 |

FOREIGN PATENT DOCUMENTS

| WO | 2016046607 A1 | 3/2016 |
| WO | 2017135803 A1 | 8/2017 |
| WO | 2018059512 A1 | 4/2018 |

OTHER PUBLICATIONS

International Search Report Form PCT/ISA/210, and Written Opinion Form PCT/ISA/237, International Application No. PCT/CN2019/081590 pp. 1-6 International Filing Date Apr. 4, 2019, dated Jun. 21, 2019.

Translated Chinese Office Action, pp. 1-10.

Translated Chinese First Search Report.

Samsung: "LAA energy detection adaptation" 3GPP TSG RAN WG1 #82bis Malmo, Sweden, Oct. 5-9, 2015, pp. 1-3.

Partial European Search Report, dated Dec. 2, 2021. pp. 1-18.

\* cited by examiner

| Time domain positions of SS/PBCH blocks in one subframe (1 ms) with 15 kHz SCS ||||||||||||||
| Slot index | 0 ||||||| 1 |||||||
| Symbol index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| SSB position 1 | 1 | 1 | 1 | 1 | × | 1 | 1 | 1 | 1 | × | × | × | × | × |
| SSB position 2 | 1 | 1 | 1 | 1 | × | × | 1 | 1 | 1 | 1 | × | × | × | × |
| SSB position 3 | 1 | 1 | 1 | 1 | × | × | × | 1 | 1 | 1 | 1 | × | × | × |
| SSB position 4 | 1 | 1 | 1 | 1 | × | × | × | × | 1 | 1 | 1 | 1 | × | × |
| SSB position 5 | 1 | 1 | 1 | 1 | × | × | × | × | × | 1 | 1 | 1 | 1 | × |
| SSB position 6 | 1 | 1 | 1 | 1 | × | × | × | × | × | × | 1 | 1 | 1 | 1 |
| SSB position 7 | × | 1 | 1 | 1 | 1 | × | 1 | 1 | 1 | 1 | × | × | × | × |
| SSB position 8 | × | 1 | 1 | 1 | 1 | × | × | 1 | 1 | 1 | 1 | × | × | × |
| SSB position 9 | × | 1 | 1 | 1 | 1 | × | × | × | 1 | 1 | 1 | 1 | × | × |
| SSB position 10 | × | 1 | 1 | 1 | 1 | × | × | × | × | 1 | 1 | 1 | 1 | × |
| SSB position 11 | × | 1 | 1 | 1 | 1 | × | × | × | × | × | 1 | 1 | 1 | 1 |
| SSB position 12 | × | × | 1 | 1 | 1 | 1 | × | 1 | 1 | 1 | 1 | × | × | × |
| SSB position 13 | × | × | 1 | 1 | 1 | 1 | × | × | 1 | 1 | 1 | 1 | × | × |
| SSB position 14 | × | × | 1 | 1 | 1 | 1 | × | × | × | 1 | 1 | 1 | 1 | × |
| SSB position 15 | × | × | 1 | 1 | 1 | 1 | × | × | × | × | 1 | 1 | 1 | 1 |
| SSB position 16 | × | × | × | 1 | 1 | 1 | 1 | 1 | 1 | 1 | 1 | × | × | × |
| SSB position 17 | × | × | × | 1 | 1 | 1 | 1 | × | 1 | 1 | 1 | 1 | × | × |
| SSB position 18 | × | × | × | 1 | 1 | 1 | 1 | × | × | 1 | 1 | 1 | 1 | × |
| SSB position 19 | × | × | × | 1 | 1 | 1 | 1 | × | × | × | 1 | 1 | 1 | 1 |
| Note: 1 denotes an SBB transmission position, an SSB occupies 4 consecutive symbols; × denotes a blank ||||||||||||||

| Time domain positions of SS/PBCH blocks in one quanter subframe (1/4 ms) with 60 kHz SCS | | | | | | | | | | | | | | |
|---|---|---|---|---|---|---|---|---|---|---|---|---|---|---|
| Symbol index (about 17.85 μs) | 0 | 1 | 2 | 3 | 4 | 5 | 6 | 0 | 1 | 2 | 3 | 4 | 5 | 6 |
| SSB position 1 | 1 | 1 | 1 | 1 | × | 1 | 1 | 1 | 1 | × | × | × | × | × |
| SSB position 2 | 1 | 1 | 1 | 1 | × | × | 1 | 1 | 1 | 1 | × | × | × | × |
| SSB position 3 | 1 | 1 | 1 | 1 | × | × | × | 1 | 1 | 1 | 1 | × | × | × |
| SSB position 4 | 1 | 1 | 1 | 1 | × | × | × | × | 1 | 1 | 1 | 1 | × | × |
| SSB position 5 | 1 | 1 | 1 | 1 | × | × | × | × | × | 1 | 1 | 1 | 1 | × |
| SSB position 6 | × | 1 | 1 | 1 | 1 | × | 1 | 1 | 1 | 1 | × | × | × | × |
| SSB position 7 | × | 1 | 1 | 1 | 1 | × | × | 1 | 1 | 1 | 1 | × | × | × |
| SSB position 8 | × | 1 | 1 | 1 | 1 | × | × | × | 1 | 1 | 1 | 1 | × | × |
| SSB position 9 | × | 1 | 1 | 1 | 1 | × | × | × | × | 1 | 1 | 1 | 1 | × |
| SSB position 10 | × | 1 | 1 | 1 | 1 | × | × | × | × | × | 1 | 1 | 1 | 1 |
| SSB position 11 | × | × | 1 | 1 | 1 | 1 | × | 1 | 1 | 1 | 1 | × | × | × |
| SSB position 12 | × | × | 1 | 1 | 1 | 1 | × | × | 1 | 1 | 1 | 1 | × | × |
| SSB position 13 | × | × | 1 | 1 | 1 | 1 | × | × | × | 1 | 1 | 1 | 1 | × |
| SSB position 14 | × | × | 1 | 1 | 1 | 1 | × | × | × | × | 1 | 1 | 1 | 1 |
| SSB position 15 | × | × | × | 1 | 1 | 1 | 1 | × | 1 | 1 | 1 | 1 | × | × |
| SSB position 16 | × | × | × | 1 | 1 | 1 | 1 | × | × | 1 | 1 | 1 | 1 | × |
| SSB position 17 | × | × | × | 1 | 1 | 1 | 1 | × | × | × | 1 | 1 | 1 | 1 |
| SSB position 18 | × | × | × | × | 1 | 1 | 1 | 1 | × | 1 | 1 | 1 | 1 | × |
| SSB position 19 | × | × | × | × | 1 | 1 | 1 | 1 | × | × | 1 | 1 | 1 | 1 |
| Note: 1 denotes an SBB transmission position, an SSB occupies 4 consecutive symbols; × denotes a blank | | | | | | | | | | | | | | |

INFORMATION TRANSMISSION METHOD, DEVICE, BASE STATION AND COMPUTER READABLE STORAGE MEDIUM

CROSS-REFERENCE TO RELATED APPLICATIONS

This is a National Stage Application, filed under 35 U.S.C. 371, of International Patent Application No. PCT/CN2019/081590, filed on Apr. 4, 2019, which is based on and claims priority to Chinese patent application No. 201810302936.8, filed on Apr. 6, 2018, disclosure of which is incorporated herein by reference in its entirety.

TECHNICAL FIELD

The present disclosure relates to the field of communications and, in particular, to information transmission method and apparatus, a base station and a computer readable storage medium.

BACKGROUND

At the 75th RAN meeting, a Study Item (SI) specific to NR-based access to unlicensed spectrum (NR-U) has been set up. The SI supports scenarios such as carrier aggregation (CA) between an NR PCell and an NR-U SCell, dual connection (DC) between an NR PCell and an NR-U PSCell, DC between an LTE PCell and an NR-U PSCell, and NR-U standalone. In the scenarios of CA between the NR PCell and the NR-U SCell, NR PCell+NR-U PSCell DC, and LTE PCell+NR-U PSCell DC, an initial access may be performed on a licensed carrier. However, it is also necessary to support the initial access on an NR unlicensed carrier to implement an RRM measurement. Particularly, in the NR-U standalone scenario, it is an inevitable choice to support the initial access to adopt NR-U to implement synchronization, measurement and other functions. Based on this, it is necessary to study the initial access process on an NR-U carrier, especially, study the design of NR-U SS/PBCH block.

According to the current consensus about the design of the NR-SS/PBCH block in NR, for consecutive transmission of multiple SS/PBCH blocks in an SS/PBCH block pattern in CaseB, CaseD and CaseE where subcarrier spacings (SCSs) are 30 kHz, 120 kHz and 240 kHz respectively, if the multiple SS/PBCH blocks are all transmitted in manner of beams, a CCA detection cannot be performed since there is no gap between the consecutive SS/PBCH blocks. This affects cell synchronization and measurements of UEs in some beam directions. To solve this problem, in one aspect, it is necessary to design a transmission method for consecutive SS/PBCH blocks that satisfies regulation requirements of the unlicensed carrier; in another aspect, it is necessary to redesign an SS/PBCH block time domain pattern that satisfies NR-U spectrum features. Additionally, LBT on the unlicensed carrier is not considered in NR-SS/PBCH block design of the number of limited SS/PBCH block positions that can be supported within a 5 ms SS/PBCH block time window, so it is suggested to consider a method for increasing SS/PBCH block transmission occasions. The NR-SS/PBCH block occupies 20 PRBs in frequency domain. This does not satisfy the ETSI regulation requirement where at least 80% of a bandwidth is occupied in the unlicensed spectrum. For example, for a 20 MHz bandwidth, SCS is 30 kHz, and an SS/PBCH block thereof just corresponds a transmission bandwidth of 7.2 MHz in the frequency domain. To satisfy the occupied channel bandwidth (OCB) requirement on the unlicensed carrier, it is necessary to design SS/PBCH block satisfying the OCB. Meanwhile, it is necessary to consider an abnormity processing method for CCA detection failure on the SS/PBCH block.

In view of the preceding problems, there is not yet an effective information transmission mechanism.

SUMMARY

Embodiments of the present disclosure mainly provide an information transmission method and apparatus, a base station and a computer readable storage medium to solve the problem of effective information transmission in the related art.

To solve the preceding technical problem, an embodiment of the present disclosure provides an information transmission method. The method includes the steps described below.

At least one of a time domain position, a frequency domain position or a spatial domain position for transmitting information is determined. Information includes a signal and/or a channel.

Transmission of the information is performed at the determined at least one of the time domain position, the frequency domain position or the spatial domain position of the information transmission.

According to an exemplary embodiment, before the step of performing the transmission of the information at the determined at least one of the time domain position, the frequency domain position or the spatial domain position of the information transmission, the method includes performing a clear channel assessment (CCA)/listen-before-talk (LBT) detection, or performing a beam-based CCA/LBT detection.

According to an exemplary embodiment, the step of performing the transmission of the information at the determined at least one of the time domain position, the frequency domain position or the spatial domain position for transmitting the information includes at least one of the steps described below.

An equipment performs a CCA/LBT detection before an information position. In the case where the CCA/LBT succeeds, the equipment performs the transmission of the information at the current information position. In the case where the CCA/LBT detection fails, the equipment abandons the transmission of the information at the current information position.

An equipment simultaneously performs CCAs/LBT detections at multiple frequency domain positions of a time domain position of the information. In the case where a CCA/LBT detection succeeds at at least one of the multiple frequency domain positions, the equipment performs the transmission of the information at the at least one of the multiple frequency domain positions of the time domain position of information. In the case where the CCA/LBT detections fail at all of the multiple frequency domain positions, the equipment abandons the transmission of the information at the current information position.

According to an exemplary embodiment, the step of performing the transmission of the information at the determined at least one of the time domain position, the frequency domain position or the spatial domain position for transmitting the information includes at least one of the steps described below.

An equipment simultaneously performs CCAs/LBT detections in multiple directional beam directions. In the case where a channel is detected to be idle in at least one of the multiple beam directions, the equipment performs the transmission of the information at the current information position by using the at least one of the multiple beam directions where the channel is detected to be idle.

An equipment performs a CCA/LBT detection in a specific directional beam direction. In the case where a channel is detected to be idle in the specific directional beam direction, the transmission of the information is performed by using a current directional beam direction.

An equipment simultaneously performs CCAs/LBT detections in a specific directional beam direction at multiple frequency domain positions of an information position. In the case where a CCA/LBT detection succeeds in a directional beam at at least one of the multiple frequency domain positions, the equipment performs the transmission of the information at the at least one of the multiple frequency domain positions by using the specific directional beam direction.

An equipment simultaneously performs CCAs/LBT detections in multiple directional beam directions at multiple frequency domain positions of an information position. In the case where a CCA/LBT detection succeeds in at least one of multiple beams at at least one of the multiple frequency domain positions, the equipment performs the transmission of the information at the at least one of the multiple frequency domain positions by using the at least one of the multiple beams where a channel is detected to be idle.

According to an exemplary embodiment, in the case where a CCA/LBT detection of an equipment fails before a current information transmission position, the method further includes at least one of the processing modes described below.

An equipment re-performs a CCA/LBT detection at an information position after a first attempt of transmission of all information to be transmitted is completed. In the case where a channel is detected to be idle, retransmission of the information is performed at the current information position. In the case where the channel is detected to be busy, the retransmission of the information is abandoned at the current information position. In next retransmission of the information, a CCA/LBT detection is re-performed at a next information position or a position after retransmission of the information to be retransmitted is completed once, and the retransmission of the information is attempted.

An equipment reattempts a CCA/LBT detection at a next information position. In the case where a channel is detected to be idle, retransmission of the information is performed at the current information position. In the case where a channel is detected to be busy, the retransmission of the information is abandoned at the current information position; and at a further next information position, a CCA/LBT detection is continuously reattempted, and the retransmission of the information is attempted.

An equipment reattempts a CCA/LBT detection at a specific frequency domain position of a next information position. In the case where a channel is detected to be idle, retransmission of the information is performed at the frequency domain position of the current information position detected to be idle. In the case where the channel is detected to be busy, the preceding processing mode is used.

An equipment reattempts CCA/LBT detections at multiple frequency domain positions of a next information position. In the case where a channel is detected to be idle at at least one of the multiple frequency domain positions, retransmission of the information is performed at the at least one of the multiple frequency domain positions of the current information position detected to be idle. In the case where the channel is detected to be busy, the preceding processing mode is used.

According to an exemplary embodiment, in the case where a CCA/LBT detection of an equipment fails before a current information transmission position, the method further includes at least one of the processing modes described below.

An equipment switches a directional beam direction and reattempts a CCA/LBT detection. In the case where a channel is detected to be idle in the beam direction after switching, the transmission of the information is performed by using the beam direction after switching. In the case where the channel is detected to be busy, the beam direction is switched, and the preceding processing mode is used.

An equipment reattempts a CCA/LBT detection by using an original beam direction at a next information position or an information position after a first attempt of transmission of all information to be transmitted is completed. In the case where a channel is detected to be idle on the original beam at the current information position, the equipment performs the transmission of the information at the current information position by using the original beam direction. In the case where a detection to the channel fails, in next retransmission of the information, a CCA/LBT detection is reattempted by using the original beam direction at the next information position or a position after retransmission of the information to be retransmitted is completed once, and the preceding processing mode is used.

An equipment reattempts a CCA/LBT detection at a specific frequency domain position of a next information position by using an original beam direction. In the case where a channel is detected to be idle, the equipment performs the transmission of the information at the specific frequency domain position by using the original beam direction. In the case where a detection to the channel fails, the processing mode is used.

An equipment reattempts CCAs/LBT detections at multiple frequency domain positions of a next information position by using an original beam direction. In the case where a CCA/LBT succeeds within an original beam at at least one of the multiple frequency domain positions, the equipment performs the transmission of the information at the at least one of the multiple frequency domain positions by using the original beam. In the case where a detection to a channel fails within a beam at none of the multiple frequency domain positions, the preceding processing mode is used.

An equipment attempts CCA/LBT detections at multiple frequency domain positions of a next information position by using multiple beam directions. In the case where a CCA/LBT detection succeeds within at least one of multiple beams at at least one of the multiple frequency domain positions, the equipment performs the transmission of the information at the at least one of the multiple frequency domain positions by using the at least one of the multiple beams where a channel is detected to be idle. In THE case where a frequency domain position and/or a beam direction where a channel is detected to be idle does not exist, the preceding processing mode is used.

An equipment performs simultaneously CCAs/LBT detections by using multiple beam directions at a next information position or an information position after a first attempt of transmission of all information to be transmitted is completed. In the case where a channel is detected to be idle in at least one of the multiple beam directions, the equipment performs the transmission of the information at the current information position by using at least one of the at least one of the multiple beams detected to be idle. In the case where a beam where a channel is detected to be idle does not exist, the preceding processing mode is used.

According to an exemplary embodiment, for consecutive information positions or information positions within an MCOT/time window, a CCA/LBT detection includes at least one of the modes described below.

An equipment performs a CCA/LBT detection before the consecutive information positions or the MCOT/time window.

Between the consecutive information positions, or between or consecutive information positions or the information positions within the MCOT/time window, an equipment performs no CCA/LBT detection, or performs a simplified CCA/LBT detection, or sends an occupancy signal at gap between the information positions.

An equipment needs to perform CCA/LBT detections at the consecutive information positions or information positions outside the MCOT.

According to an exemplary embodiment, for consecutive information transmission, in the case where an equipment performs the transmission at consecutive information positions by using the same beam direction or similar beam directions, the method includes at least one of the steps described below.

An equipment performs a CCA/LBT detection in a specific beam direction before a first information position of consecutive transmission. In the case where a channel is detected to be idle, the transmission is performed at consecutive information positions by using the beam direction. In the case where the channel is detected to be busy, a CCA/LBT detection is performed in a previous beam direction before a next information position of the consecutive transmission. The reset is processed by using the preceding processing mode.

An equipment performs a CCA/LBT detection in a specific beam direction before a first information position of the consecutive transmission. In the case where a channel is detected to be idle, the transmission is performed at consecutive information positions by using the beam direction. In the case where the channel is detected to be busy, a CCA/LBT detection is performed in a beam direction after switching before a next information position of the consecutive transmission, and the preceding processing mode is used.

An equipment simultaneously performs CCA/LBT detections in multiple beam directions before a first information position of the consecutive transmission. In the case where at least one beam where a channel is detected to be idle exists, the transmission of the information is performed at consecutive information positions by using at least one of the at least one beam direction detected to be idle. In the case where a beam where a channel is detected to be idle does not exist, the transmission of the information is abandoned at a current position. CCAs/LBT detections are re-performed in the multiple beam directions before a next information position of the consecutive transmission, and the preceding processing mode is used.

According to an exemplary embodiment, in the case of using different beam directions at consecutive information positions, a calculation mode of a received energy includes at least one of the steps described below.

A sum of detected energies in respective beam directions is used as the received energy.

An average of detected energies in respective beam directions is used as the received energy.

The maximum value among detected energies within respective beams is used as the received energy.

The minimum value among detected energies within respective beams is used as the received energy.

According to an exemplary embodiment, in the case of using different beam directions at consecutive information positions, a beam direction of information transmission includes at least one of:

an original beam direction corresponding to an information position;

a beam direction having a best channel state;

a beam direction having a suboptimal channel state or a middle interference;

a beam corresponding to an union of respective beams; or a beam corresponding to an intersection of respective beams.

According to an exemplary embodiment, the information includes at least one of:

a synchronization signal/physical broadcast channel block (SS/PBCH block), a physical uplink shared channel, a physical downlink shared channel, a physical uplink control channel, a physical downlink control channel, an uplink or downlink reference signal, an Msg message in a random access process, or Paging.

According to an exemplary embodiment, in the case where the information is an SS/PBCH block, a method for increasing an occasion of SS/PBCH block transmission includes one of the steps described below.

The number of SS/PBCH block positions within a time window for the SS/PBCH block transmission is increased.

The length of a time window for the SS/PBCH block transmission is increased.

A short period of the SS/PBCH block transmission is introduced into an SSB burst set.

Multiple SS/PBCH block positions are configured in frequency domain.

According to an exemplary embodiment, a method for enabling an SS/PBCH block to satisfy a requirement for an occupied channel bandwidth in an unlicensed spectrum in frequency domain includes at least one of the steps described below.

The SS/PBCH block is transmitted as a whole for multiple times.

The SS/PBCH block is transmitted as a whole alternately with remaining minimum system information (RMSI) in the frequency domain.

The SS/PBCH block as a whole and RMSI are respectively transmitted for multiple times in the frequency domain.

The SS/PBCH block and a downlink channel/signal are multiplexed and transmitted in a manner of frequency division multiplexing (FDM).

The SS/PBCH block is transmitted in the frequency domain by using a resource element (RE)-level resource allocation mode.

According to an exemplary embodiment, the RE-level resource allocation mode of the SS/PBCH Block includes one of the manners described below.

Assuming that a bandwidth is B1 and corresponds to B2 resource blocks (RBs) and B2*12 subcarriers, dividing the B2*12 subcarriers into P1 clusters, wherein each group includes B2*12/P1 subcarriers, each of the P1 clusters includes 240/P1 SS/PBCH block positions, and the SS/PBCH block is mapped at a position having a corresponding number in each of the P1 clusters.

According to an exemplary embodiment, at least one of the time domain position of the information, the frequency domain position of the information, the spatial position of the information, a time domain pattern of the information, a start position of the information in time domain, a size of a time window for the information transmission, a parameter for determining the time domain position/time domain pattern of the information, a start position of the information in frequency domain, a number of repetition times transmission in frequency domain, a start point of a SS/PBCH block resource cluster, an end point of a cluster, a size of a cluster, an LBT position, an LBT mechanism, or an indication for performing an LBT is determined/acquired through at least one of the following modes: predefinition, physical layer downlink control information (DCI) signaling, high layer radio resource control (RRC) signaling, media access control (MAC) signaling or a bitmap.

To solve the preceding technical problem, an embodiment of the present disclosure further provides an information transmission apparatus. The apparatus includes a determination module and a transmission module.

The determination module is configured to determine at least one of a time domain position, a frequency domain position or a spatial domain position for transmitting information. Information includes a signal and/or a channel.

The transmission module is configured to perform the transmission of the information at the at least one of the time domain position, the frequency domain position or the spatial domain position of the information transmission determined by the determination module.

To solve the preceding technical problem, an embodiment of the present disclosure further provides a base station. The base station includes a processor, a memory and a communication bus.

The communication bus is configured to implement a connection communication between the processor and the memory.

The processor is configured to execute one or more programs stored in the memory, so as to perform the steps of the information transmission method of any embodiment described above.

To solve the preceding technical problem, an embodiment of the present disclosure further provides a computer-readable storage medium. The computer-readable storage medium stores one or more programs executable by one or more processors to perform the steps of the information transmission method of any embodiment described above.

The present disclosure has the beneficial effects below.

According to embodiments of the present disclosure, an information transmission method and apparatus, a base station and a storage medium are provided to establish a complete and effective information transmission mechanism. The mechanism is applicable to at least one of a licensed spectrum, an unlicensed spectrum, a shared spectrum, or various available spectra and, especially, to the unlicensed spectrum.

Other features of the present disclosure and corresponding beneficial effects are set forth later in the description, and it is to be understood that at least part of the beneficial effects become apparent from the description of the present disclosure.

BRIEF DESCRIPTION OF DRAWINGS

FIGS. 12 to 15 are schematic diagrams of time domain positions.

DETAILED DESCRIPTION

To make the objects, solutions and advantages of the present disclosure clearer, the embodiments of the present disclosure are further described below in detail in conjunction with implementations and the drawings. It is to be understood that the embodiments described herein are intended to explain the present disclosure and not to limit the present disclosure.

In an information transmission method, an information transmission apparatus, a base station and a computer readable storage medium provided in the present disclosure, information includes a signal and/or a channel. The signal includes a synchronization signal, an uplink or downlink reference signal (such as a demodulation reference signal, a channel state information reference signal, a sounding reference signal and a phase tracking reference signal), an Msg message in a random access process, a Paging message or the like. The channel includes a physical broadcast channel block, a physical uplink shared channel, a physical downlink shared channel, a physical uplink control channel, a physical downlink control channel or the like. Therefore, the information transmission method, the information transmission apparatus, the base station and the computer readable storage medium of the present disclosure are applicable to not only the synchronous signal/physical broadcast channel block, but also the physical uplink shared channel, the physical downlink shared channel, the physical uplink control channel, the physical downlink control channel, the uplink or downlink reference signal (such as the demodulation reference signal, the channel state information reference signal, the sounding reference signal, the phase tracking reference signal or the like), the Msg message in the random access process, the Paging message or the like. The method of the present disclosure is applicable to at least one of a licensed spectrum, an unlicensed spectrum, a shared spectrum or an available spectrum.

Figure 1:
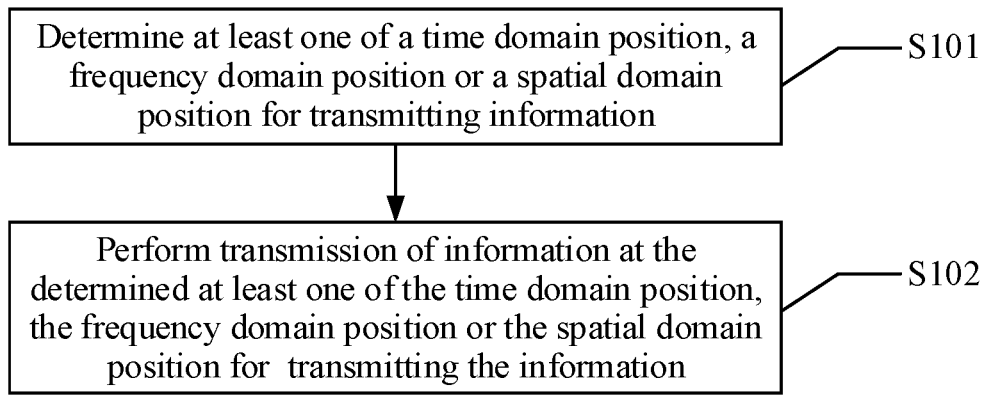
FIG. 1 is a flowchart of an information transmission method according to the present disclosure.

As shown in FIG. 1, an information transmission method in an embodiment of the present disclosure includes the steps described below.

In step S101, at least one of a time domain position, a frequency domain position or a spatial domain position for transmitting information is determined.

In step S102, transmission of the information is performed at the at least one of the time domain position, the frequency domain position or the spatial domain position of the information transmission determined in step S101.

The method of the present disclosure is described below by using a synchronization signal/physical broadcast channel block (SS/PBCH block) as an example.

Embodiment One

An embodiment provides a design method of a time domain position or a time domain pattern of a synchronous signal/physical broadcast channel block (SS/PBCH block, SSB). Optionally, a corresponding time domain pattern of the SSB is designed according to subcarrier spacing (SCS).

A parameter for determining a time domain position of the SS/PBCH block or a time domain pattern of the SS/PBCH block, or the time domain position of the SS/PBCH block, or the time domain pattern of the SS/PBCH block may be determined or obtained through at least one of the following modes: predefinition, MAC layer signaling, high layer RRC signaling or physical layer DCI signaling.

The parameter for determining the time domain position of the SS/PBCH block or the time domain pattern of the SS/PBCH block includes at least one of a start position, an end position, a length of consecutive symbols (also referred to as an SSB size), a subcarrier spacing, a carrier frequency band, the number of SSBs, or a spacing between SSBs.

The time domain position of the SS/PBCH block or the time domain pattern of the SS/PBCH block is a time domain position within one time unit. The time unit includes at least one of P1 frames, P2 subframes, P3 slots, P4 mini slots, P5 time windows, P6 periodic time periods or P7 symbols. P1, P2, P3, P4, P5, P6 and P7 are numbers greater than 0. Optionally, P1 is 1/n, where n is a number greater than or equal to 1, such as n is 1, 2, 3, 4, 5, 6, 7, 8, 9 or 10. A time window includes one or t frames, one or t subframes, one or t slots, one or t mini slots or one or t symbols. A time domain position of the SS/PBCH block, or a time domain pattern of the SS/PBCH block within a periodic time period refers to a time domain position of the SS/PBCH Block within a period. The start position and the end position are relative to subframe, slot, mini slot, time window, periodic time period and symbol. The number of symbols included in the mini slot is not greater than the number of symbols included in the slot. Specifically, the number of symbols included in one subframe may be determined according to the subcarrier spacing. For example, the subcarrier spacing is 15 KHz, and one subframe includes 14 or 12 symbols. Taking the case of 15 KHz as a base, in the case where the subframe spacing is 30 KHz, the number of symbols included in one subframe is accordingly 2*14 or 2*12. The number of symbols included in one subframe with other subcarrier spacing is obtained by scaling the number of symbols included in one subframe with the subcarrier spacing of 15 KHz.

For the SS/PBCH block, a supported subcarrier spacing includes at least one of 15 kHz, 30 kHz, 60 kHz, 120 kHz or 240 kHz.

In view of some commonly used subcarrier spacings, preferred time domain positions of SS/PBCH block or preferred time domain patterns of SS/PBCH block are given below. However, time domain positions of SS/PBCH block or time domain patterns of SS/PBCH block are not limited to the time domain positions described below.

Case 1: in view of a subcarrier spacing of 15 kHz, start symbol indexes of SSs/PBCH blocks are {#S1, #S2}. S1 and S2 satisfy that S2 is not less than S1+ the number of time domain symbols of an SS/PBCH block. Optionally, {#S1, #52} indicates that within one subframe, there are two start symbol positions of SS/PBCH blocks, whose indexes are #S1 and #S2. {#S1, #52} +14*Nsf denotes start symbol positions of SS/PBCH blocks within Nsf subframes. The range of S1 is [0, 3]. The range of S2 is [7, 10] or [4, 10]. The range of Nsf is [0, L]. L denotes the number of SSs/PBCH blocks within one time unit. L has different values according to different carrier frequency bands and/or different carrier attributes and/or different subcarrier spacings. Optionally, the number of SS/PBCH block positions on an unlicensed carrier is not less than the number of SSs/PBCH blocks on a licensed carrier. FIG. 12 is a schematic diagram of time domain positions of SSs/PBCH blocks within one subframe (1 ms) with the SCS of 15 kHz.

Figure 13:
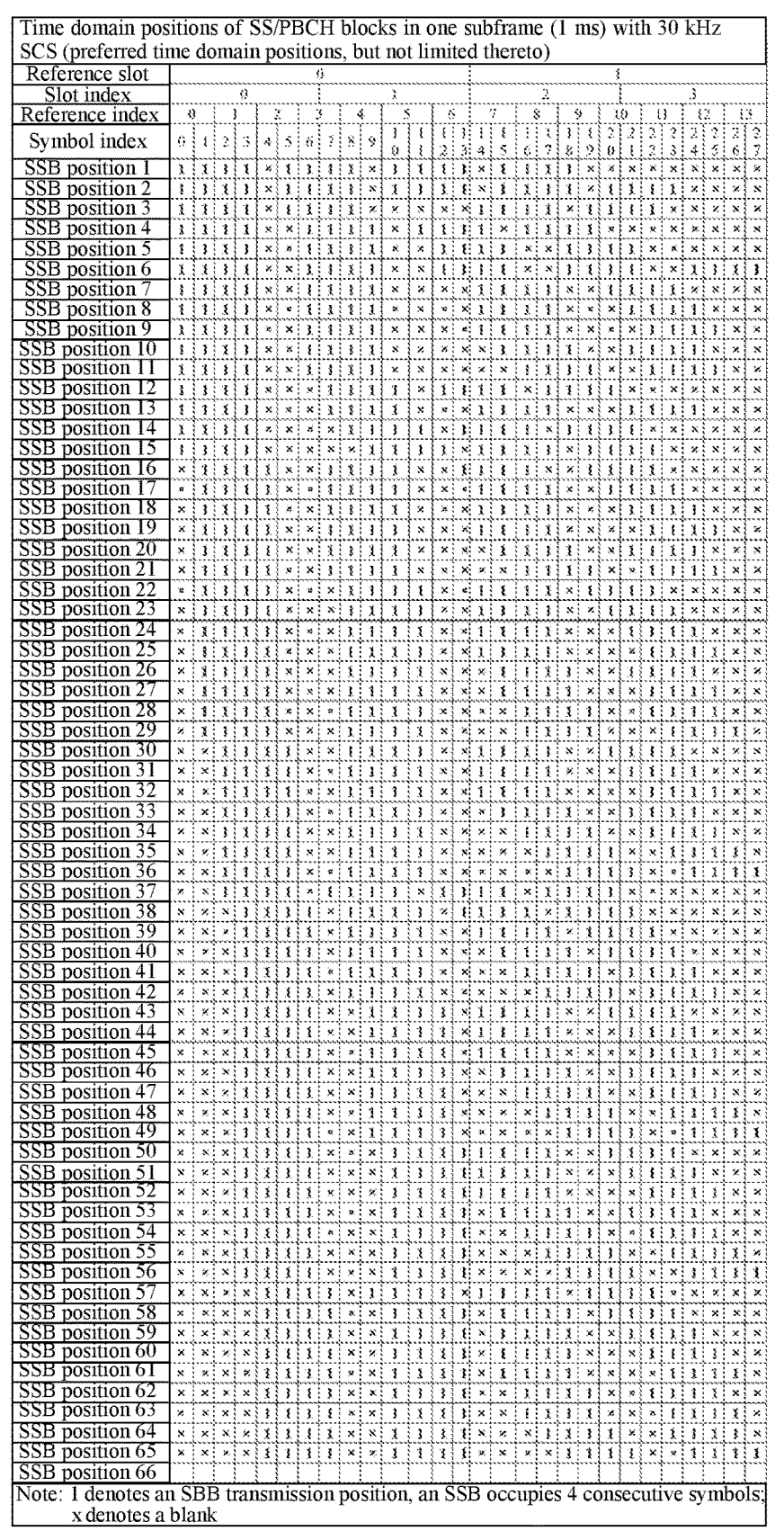

Case 2: in view of a subcarrier spacing of 30 kHz, start symbol indexes of SSs/PBCH blocks are {#S1, #, #S3, #S4}. S1, S2, S3 and S4 satisfy at least one of: S1<=S2<=S3<=S4; S1 denotes a start symbol within one subframe, S2 is not less than S1+ the number of time domain symbols of an SS/PBCH block; S3 is not less than S2+the number of time domain symbols of the SS/PBCH block, or S3 denotes a third start position within one subframe, or S3 denotes a second slot corresponding to 15 KHz SCS or a third slot corresponding to 30 KHz SCS; S4 is not less than S3+the number of time domain symbols of the SS/PBCH block. Optionally, {#S1, #S2, #S3, #54} indicates that within one subframe, there are four start symbol positions of SSs/PBCH blocks, whose indexes are #S1, #S2, #S3 and #S4. {#S1, #S2, #S3, #54}+28*Nsf denotes start symbol positions of SSs/PBCH blocks within Nsf subframes. The range of Nsf is [0, L]. The range of S1 is [0, 4]. The range of S2 is [6, 10]. The range of S3 is [12, 18]. The range of S4 is [20, 24]. L denotes the number of SSs/PBCH blocks within a time unit. L has different values according to different carrier frequency bands and/or different carrier attributes and/or unlicensed subcarrier spacings. Optionally, the number of SS/PBCH block positions on an unlicensed carrier is not less than the number of SSs/PBCH blocks on a licensed carrier. FIG. 13 is a schematic diagram of time domain positions of SSs/PBCH blocks within one subframe (1 ms) with the SCS of 30 kHz.

Case 3: in view of a subcarrier spacing of 60 kHz, start symbol indexes of SSs/PBCH blocks are {#S1, #S2, #S3, #S4, #S5, #S6, #S7, #58}+56*Nsf, or {#S1, #S2, #S3, #54}+28*N", or {#S1, #S2}+14*N'. Nsf denotes the number of subframes. N" denotes the number of half subframes. N' denotes the number of quarter subframes. Ranges of Nsf, N' and N" are each [0, [L/the number of start points]−1]. L is determined according to the number of SSs/PBCH blocks in a time unit. For example, if there are 16 SSs/PBCH blocks within the time unit, then values of Nsf are 0 and 1, values of N' are 0, 1, 2, 3, 4, 5, 6 and 7, and values of N" are 0, 1, 2 and 3. FIG. 14 is a schematic diagram of time domain positions of SSs/PBCH blocks within one quarter subframe (¼ ms) with the SCS of 60 kHz.

Optionally, time domain positions of SSs/PBCH blocks may be designed in terms of subframe, that is, at least one of symbol start points, the number of consecutive symbols, or spacing between consecutive symbols may be determined within the subframe. Alternatively, time domain positions of SSs/PBCH blocks may be designed within the half subframe, that is, at least one of symbol start points, the number of consecutive symbols, or spacing between consecutive symbols may be determined within the half subframe. Alternatively, time domain positions of SSs/PBCH blocks may be designed within the quarter subframe, that is, at least one of symbol start points, the number of consecutive symbols, or spacing between consecutive symbols may be determined within the quarter subframe.

Case 4: in view of a subcarrier spacing of 120 kHz, start symbol indexes of SSs/PBCH blocks are {#S1, #S2, #S3, #S4, #S5, #S6, #S7, #S8, #S9, #S10, #S11, #S12, #S13, #S14, #S15, #S16}+112*Nsf, or {#S1, #S2, #S3, #S4, #S5, #S6, #S7, #S8}+56*N''', or {#S1, #S2, #S3, #S4}+28*N'', or {#S1, #S2}+14*N'. Nsf denotes the number of subframes. N''' denotes the number of half subframes. N'' denotes the number of quarter subframes. N' denotes the number of eighth subframes. Ranges of Nsf, N', N'' and N''' are each [0, [L/the number of start points]−1]. L is determined according to the number of SSs/PBCH blocks within a time unit. For example, if there are 16 SS/PBCH blocks within the time unit, then Nsf is 0, values of N''' are 0 and 1, values of N'' are 0, 1, 2 and 3, and values of N' are 0, 1, 2, 3, 4, 5, 6 and 7. The time domain positions of SSs/PBCH blocks may correspond to time domain positions of SSs/PBCH blocks corresponding to (1/n)*120 kHz, or corresponding time domain positions of SSs/PBCH blocks may be designed based on (1/n) subframe. For a schematic diagram of time domain positions of SSs/PBCH blocks within the quarter subframe with the subcarrier spacing of 120 kHz, reference may be made to a schematic diagram of time domain positions of SSs/PBCH blocks in one subframe with the subcarrier spacing of 30 kHz shown in FIG. 13.

Figure 15:
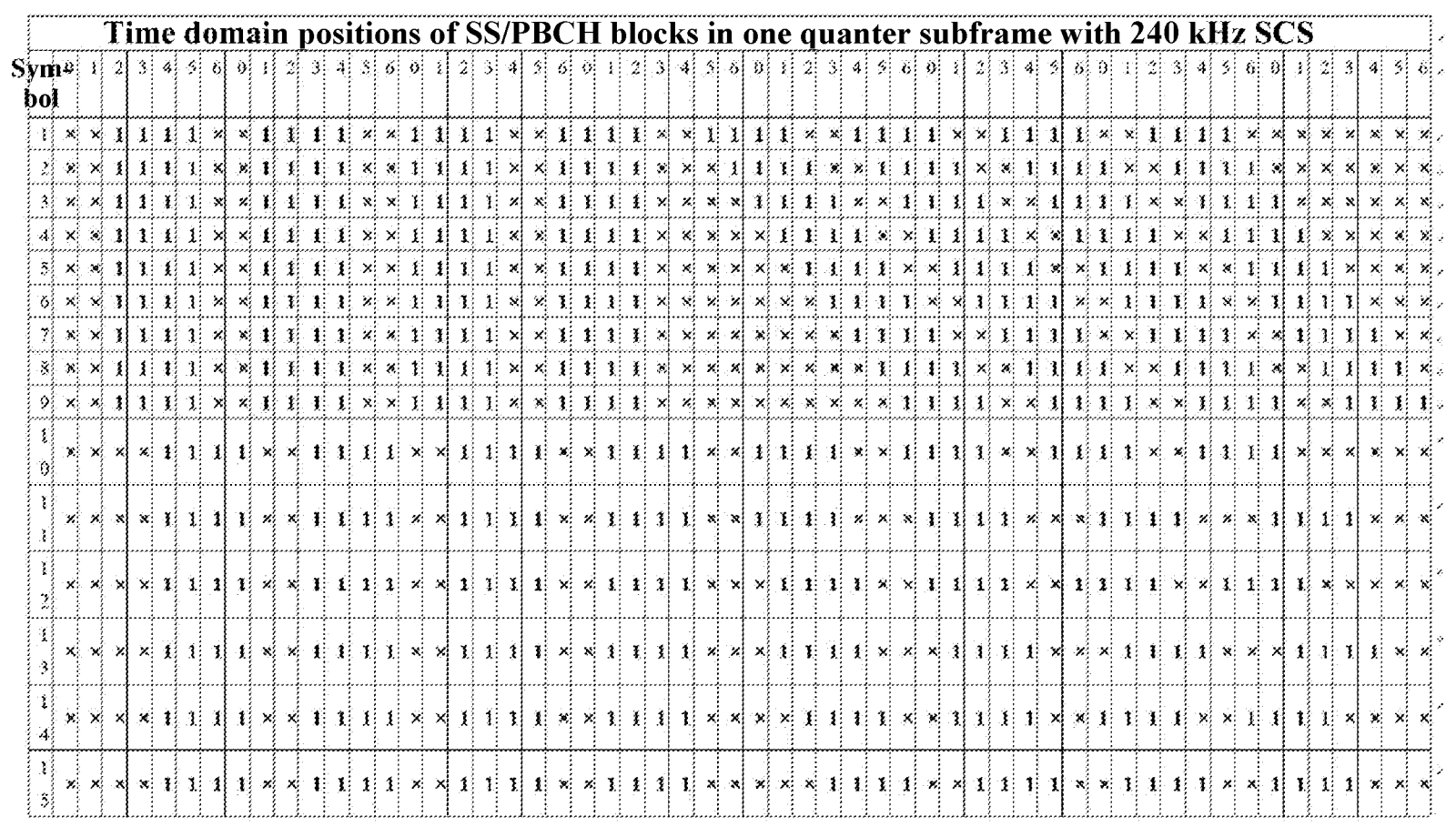

Case 5: in view of a subcarrier spacing of 240 kHz, start symbol indexes of SSs/PBCH blocks are {#S1, #S2, #S3, #S4, #S5, #S6, #S7, #S8, #S9, #S10, #S11, #S12, #S13, #S14, #S15, #S16, #S17, #S18, #S19, #S20, #S21, #S22, #S23, #S24, #S25, #S26, #S27, #S28, #S29, #S30, #S31, #S32}+224*Nsf, or {#S1, #S2, #S3, #S4, #S5, #S6, #S7, #S8, #S9, #S10, #S11, #S12, #S13, #S14, #S15, #S16}+112*N'''', or {#S1, #S2, #S3, #S4, #S5, #S6, #S7, #S8}+56*N''', or {#S1, #S2, #S3, #S4}+28*N'', or {#S1, #S2}+14*N'. Nsf denotes the number of subframes. N'''' denotes the number of half subframes. N''' denotes the number of quarter subframes. N'' denotes the number of eighth subframes. N' denotes the number of sixteenth subframes. Ranges of Nsf, N', N'', N''' and N'''' are each [0, [L/the number of start points]−1]. L is determined according to the number of SSs/PBCH blocks within a time unit. For example, if there are 32 SS/PBCH blocks within the time unit, then Nsf is 0, values of N'''' are 0 and 1, values of N''' are 0, 1, 2 and 3, values of N'' are 0, 1, 2, 3, 4, 5, 6 and 7, and values of N' are 0, 1, 2, 3, 4, 5, 6, 7, 8, 9, 10, 11, 12, 13, 14 and 15. The time domain positions of SSs/PBCH blocks may correspond to time domain positions of SSs/PBCH blocks corresponding to (1/n)*240 kHz, or corresponding time domain positions of SSs/PBCH blocks may be designed based on (1/n) subframe. FIG. 15 is a schematic diagram of time domain positions of SSs/PBCH blocks in the quarter subframe with the subcarrier spacing of 240 kHz.

Optionally, on an unlicensed carrier, a gap is introduced between SSs/PBCH blocks to facilitate a CCA/LBT detection before an SS/PBCH block.

Particularly, in the case where time domain positions of SSs/PBCH blocks are consecutive, optionally, the same beam direction, or similar beam directions, or an omnidirectional beam mode may be used at the positions of consecutive SSs/PBCH blocks. In the case where there is the gap between the time domain positions of the SSs/PBCH blocks, optionally, SSs/PBCH blocks may be transmitted by using different beam directions at different SSs/PBCH block positions. It is also feasible to use the same beam. The gap position may be used to perform LBT or send an occupancy signal such as remaining system information (RMSI), an uplink/downlink reference signal or uplink/downlink data.

Embodiment Two

An embodiment provides a method of SS/PBCH block transmission at a time domain position or a time domain pattern configured for an SS/PBCH block. The method of the embodiment is applicable to a scenario of an unlicensed carrier or a competitive use on spectrum resources.

A base station performs the SS/PBCH block transmission only at an SS/PBCH block position where a channel is detected to be idle (or LBT succeeds). A basic unit of the SS/PBCH block transmission is the SS/PBCH block.

If the LBT succeeds before the SS/PBCH block transmission at the SS/PBCH block position, the base station performs the SS/PBCH block transmission at a current SS/PBCH block position. If the LBT fails before the SS/PBCH block transmission at the SS/PBCH block position, the base station abandons the SS/PBCH block transmission at the current SS/PBCH block position.

If a directional beam direction is used in the SS/PBCH block transmission, one of the processing modes described below may be used. 1) The base station determines the busy and idle state of a current channel in multiple directional beam directions simultaneously by using a beam-based LBT mechanism. If a channel is detected to be idle in at least one of the multiple directional beam directions, then the SS/PBCH block transmission is performed at the current SS/PBCH block position by using at least one beam detected to be idle. 2) The base station assesses the state of a current channel in a specific directional beam direction by using beam-based LBT. If the channel is assessed to be idle, the SS/PBCH block transmission is performed in the current directional beam direction. If the channel is assessed to be busy, the base station abandons the SS/PBCH block transmission at the current SS/PBCH block position. If a moment where the channel is assessed to be busy does not reach a moment for the SS/PBCH block transmission, optionally, the base station continues to perform an LBT detection, and if the LBT fails, the base station abandons the current transmission. Alternatively, the base station switches the beam direction and reassesses a channel state in a beam direction after switching. If the LBT succeeds, the SS/PBCH block transmission is performed at the current SS/PBCH block position. Otherwise, if the LBT fails, the transmission is abandoned; or the beam direction is switched again and a channel state is reassessed in a current beam direction, where the processing mode is the same as that described above.

In the case where time domain positions of SSs/PBCH blocks are consecutive or there is no gap between consecutive SSs/PBCH blocks, the SS/PBCH block transmission method includes at least one of the modes described blow.

Mode 1: if a CCA detection performed by a base station succeeds or a channel is assessed by the base station to be idle at a current SS/PBCH block position, then the base station performs SSB transmission at the current position. Optionally, the base station abandons, empties, or does not performs the SSB transmission at a next SS/PBCH block position.

If the CCA detection performed by the base station fails or the channel is assessed by the base station to be busy at the current SS/PBCH block position, then the base station abandons, empties, or does not performs the SSB transmission at the current SS/PBCH block position. The base station performs a CCA detection before a next SS/PBCH block position. If the CCA succeeds or a channel is assessed to be idle, the SSB transmission is performed at the current SS/PBCH block position. Otherwise, the transmission is abandoned or not performed at the current position.

Mode 2: if a CCA detection performed by a base station succeeds or a channel is assessed by the base station to be idle in a specific beam direction at a current SS/PBCH block position, then the base station performs SS/PBCH block transmission at consecutive SS/PBCH block positions by using the beam direction. If the CCA detection performed by the base station fails or the channel is assessed by the base station to be busy in the specific beam direction at the current SS/PBCH block position, then the base station abandons or does not perform the SS/PBCH block transmission at the current position. The channel assessment is continued in the beam direction. If the CCA fails, the CCA detection is continued by using the beam direction, or a CCA detection is continued by using a beam direction after switching. If the CCA succeeds, the SS/PBCH block transmission is performed at the SS/PBCH block position by using the beam direction or the beam direction after switching. Once the CCA succeeds, the SS/PBCH block transmission is performed at remaining consecutive SS/PBCH block positions. The rest is processed in the same way as described above.

Mode 3: if a CCA detection performed by a base station succeeds or a channel is assessed by the base station to be idle in a beam #X direction at a current SS/PBCH block position, then the base station performs SSB transmission at the current SS/PBCH block position by using the beam #X direction. There is no gap between the current SS/PBCH block and a next SS/PBCH block, so a CCA detection cannot be performed since there is no gap before the next SS/PBCH block transmission position. Thus, the transmission is abandoned at a next SS/PBCH block position. The base station may perform a CCA detection in a beam #X' direction before a next but one SS/PBCH block position. If the CCA detection succeeds, or a channel is assessed to be idle, the base station performs the SSB transmission at the current SS/PBCH block position by using the beam #X' direction. The subsequent processing mode is the same as that described above.

If the CCA detection performed by the base station fails in the specific beam direction at the current SS/PBCH block position, then the base station abandons or does not performs the SS/PBCH block transmission at the current SS/PBCH block position. The base station performs a CCA detection before a next SS/PBCH block transmission position by using the beam #X direction or the beam #X'. If the CCA detection succeeds, the base station performs the SSB transmission at the current SS/PBCH block position by using the beam #X direction or the beam #X' direction. If the CCA fails, the processing mode is the same as that described above.

Optionally, if a moment where the CCA fails does not reach the current SS/PBCH block position, then the base station continues the CCA detection in the current beam direction, or switches the beam direction to perform a CCA detection.

Mode 4: a base station simultaneously performs CCAs in beam #X1, beam #X2, and beam #Xn directions at a current SS/PBCH block position. If a channel is detected to be idle in at least one of the multiple directional beam directions, then the SS/PBCH block transmission is performed at the current SS/PBCH block position by using at least one beam detected to be idle. The transmission may only be performed on the current SS/PBCH block or remaining consecutive SS/PBCH blocks. If a beam where a channel is detected to be idle does not exist among the multiple directional beam directions, the transmission is abandoned at the current SS/PBCH block position. The base station simultaneously performs CCAs in the beam #X1, beam #X2, . . . and beam #Xn directions before a next SS/PBCH block position, in a similar way to the above. If the base station performs the transmission at the current SS/PBCH block position and there is no gap before the next SS/PBCH block position, then the base station cannot perform a CCA detection and then abandons the transmission at the current SS/PBCH block position. The base station performs a CCA detection before a next but one SS/PBCH block position, and the CCA detection and the processing mode thereof are the same as above.

Optionally, in the case where there is no gap between SSs/PBCH blocks, an actual position of the SS/PBCH block transmission depends on a CCA detection result or a busy and idle state of a channel at an SS/PBCH block position. If a CCA succeeds or a channel is assessed to be idle at a current SS/PBCH block position, the base station performs the SS/PBCH block transmission at the current position. Otherwise, the SS/PBCH Block transmission is abandoned at the current position.

An SS/PBCH block occasion is used as a basic transmission unit of the SS/PBCH block transmission. The SS/PBCH block occasion includes M SSs/PBCH blocks. The SSs/PBCH blocks may be consecutive, inconsecutive, or spaced with each other.

In a scenario of an unlicensed carrier or a competitive use on spectrum resources, if an LBT performed by the base station succeeds, the base station may perform transmission of one SS/PBCH block occasion or transmission of M SSs/PBCH blocks. The SS/PBCH block transmission within the SS/PBCH block occasion does not require a CCA detection, or uses a simplified LBT mechanism, or uses an LBT mechanism with a short detection granularity. A position of the CCA detection is before a position of the SS/PBCH block occasion.

Particularly, in the case where the SS/PBCH block transmission is performed in a beam mode, optionally, the SSs/PBCH blocks within the SS/PBCH block occasion are configured with similar beam directions or the same beam direction. The base station performs a CCA detection in a specific beam #X direction before the SS/PBCH block occasion. If a channel is detected to be idle through the CCA detection, the SS/PBCH block transmission is performed at SS/PBCH block positions within the SS/PBCH block occasion by using the beam #X direction. If the channel is detected to be busy through the CCA detection, the transmission is abandoned at a first SS/PBCH block position within the SS/PBCH block occasion. A CCA detection is continued in the specific beam #X direction or a beam #N' direction after switching before a second SS/PBCH block position within the SS/PBCH block occasion. If a channel is detected to be idle through the CCA detection, the SS/PBCH block transmission is performed at the current SS/PBCH block position or remaining SS/PBCH block positions within the SS/PBCH block occasion by using the beam #X direction or the beam #N' direction after switching.

Alternatively, the base station simultaneously performs CCAs in a beam #X1, beam #X2, . . . and beam #Xn directions before the SS/PBCH block occasion. If a channel is detected to be idle in at least one of the multiple directional beam directions, then the SS/PBCH block transmission is performed at the SS/PBCH block positions within the current SS/PBCH block occasion by using at least one beam detected to be idle. If a beam direction where a channel is detected to be idle does not exist among the multiple directional beam directions, then the base station abandons the transmission at the first SS/PBCH block position within the SS/PBCH block occasion. CCAs are continued in the beam #X1, beam #X2, . . . and beam #Xn directions simultaneously before the second SS/PBCH block position, and the subsequent processing mode is the same as that described above. Optionally, the SSs/PBCH blocks within the SS/PBCH block occasion may have different beams, and for the processing mode, reference may be made to a method described in embodiment three.

In another case, if time domain positions of SSs/PBCH blocks are consecutive, or there is a gap between consecutive SS/PBCH blocks, or there is a gap between M SSs/PBCH blocks within the SS/PBCH block occasion, the gap between time domain positions of the SSs/PBCH blocks may be used for a CCA detection. Alternatively, to avoid the phenomenon where the SS/PBCH block transmission cannot be performed at a next time domain position of an SS/PBCH block or at another SS/PBCH block position within the SS/PBCH block occasion since a channel is occupied, optionally, at least one of the following operations may be performed at the gap position: performing a simplified CCA detection, for example, an LBT mechanism simpler than the SS/PBCH block occasion CCA, or a simplified LBT parameter; performing no CCA detection; performing no CCA detection only in the case where a gap duration is not greater than a preset duration; or sending an occupancy signal. The occupancy signal may be at least one of: RMSI, a downlink reference signal, downlink data, uplink control information, an uplink reference signal, measurement feedback information or uplink data.

In another case, a time window for the SS/PBCH block transmission and/or SS/PBCH block occasion transmission is introduced. For example, the time window is an MCOT. The MCOT includes multiple SSs/PBCH blocks or SS/PBCH block occasions. Optionally, SS/PBCH blocks may be consecutive and/or discrete, or SS/PBCH block occasions may be consecutive and/or discrete, or SS/PBCH blocks may be consecutive and/or discrete and SS/PBCH block occasions may be consecutive and/or discrete. Additionally, the MCOT length is related to the regulatory requirements for an unlicensed carrier. The number of SS/PBCH blocks and/or SS/PBCH block occasions included in the MCOT is related to at least one of an SS/PBCH block and/or SS/PBCH block occasion pattern, the MCOT length, subcarrier spacing or a carrier frequency.

Specifically, the base station performs a CCA detection before the MCOT starts. If the CCA detection succeeds, the base station initiates the MCOT. In the MCOT, for the SS/PBCH block transmission on the SSs/PBCH blocks and/or the SS/PBCH block occasions, the base station does not perform a CCA detection; or performs a simplified CCA detection, for example, an LBT mechanism simpler than the CCA before the MCOT starts, or a simplified LBT parameter; or performs no CCA detection only in the case where a gap duration is not greater than a preset duration. An LBT mechanism is required in the SS/PBCH block or SS/PBCH block occasion transmission outside the MCOT.

Optionally, in the MCOT, if different beam directions are used for transmitting SSs/PBCH blocks or SS/PBCH block occasions, then the base station needs to perform an LBT in each beam direction to assess a channel interference status of the current beam direction, so as to determine whether the SSB transmission can be performed on the current SS/PBCH block or the current SS/PBCH block occasion by using the beam direction or a direction set. Before SS/PBCH block positions or SS/PBCH block occasion positions corresponding to the same beam direction, the base station performs a simplified LBT mechanism, or directly performs the transmission without CCA detection.

Embodiment Three

An embodiment provides a transmission method of multiple consecutive SSs/PBCH blocks or SS/PBCH block occasions. An SS/PBCH block occasion includes M SSs/PBCH blocks. There may be a gap or no gap between the SSs/PBCH blocks.

In the case of multiple consecutive SSs/PBCH blocks or one SS/PBCH block occasion (no gap), there are at least one of the processing modes described below.

Mode 1: a base station simultaneously performs CCA detections in beam directions corresponding to the SSs/PBCH blocks, and SS/PBCH block transmission is actually performed in one of manners A to G described below.

A. The SSs/PBCH blocks are simultaneously sent on a beam where a channel is detected to be idle in a CCA detection.

B. The SSs/PBCH blocks are sequentially sent in a beam direction detected to be idle in an CCA.

C. Each SS/PBCH block is sent in a beam direction having a best channel status among beams where channels are detected to be idle in CCAs.

D. Each SS/PBCH block is sent in a beam direction having a suboptimal channel status among beams where channels are detected to be idle in CCAs.

E. Each SS/PBCH block is sent in a beam direction having a middle channel status among beams where channels are detected to be idle in CCAs.

F. If a beam corresponding to an SS/PBCH block exists among beams detected to be idle, then the SS/PBCH block is sent by using the corresponding beam direction. If the beam direction corresponding to the SS/PBCH block does not exist among the beams detected to be idle, then the SS/PBCH block is sent by using one beam direction randomly selected from the beams where the channels are detected to be idle, or sent by selecting a beam direction having the best channel status from the beams where the channels are detected to be idle, or sent by selecting a beam direction having a suboptimal channel status or a middle interference from the beams where the channels are detected to be idle.

G. On a current SS/PBCH block, the base station performs the transmission by using all B1 beam directions where channels are detected to be idle in CCA detections. On a next SS/PBCH block, the base station performs the transmission in (B1−1) beam directions where channels are detected to be idle in CCA detections. The rest can be done in the same way. The SS/PBCH block transmission is performed on a certain beam. Transmit beams of a previous SS/PBCH block certainly includes transmit beam directions of a next SS/PBCH block.

Optionally, in the case where the number of beams where channels are detected to be idle in CCA detections is not greater than the number of consecutively transmitted SS/PBCH blocks, when it is decremented to one beam for transmitting one SS/PBCH block, subsequent SS/PBCH blocks are transmitted by using the current beam direction; or when it is decremented to one beam for transmitting one SS/PBCH block, subsequent SS/PBCH blocks are sent by using a beam randomly selected from the beams where the channels are detected to be idle, or sent by selecting a beam direction having the best channel status from the beams where the channels are detected to be idle, or sent by selecting a beam direction having a suboptimal channel status or a middle interference from the beams where the channels are detected to be idle.

Mode 2: a newly designed energy or interference calculation method is used to determine whether a current channel is idle and available. If the current channel is determined to be idle, the SS/PBCH block transmission or SS/PBCH block occasion transmission is performed by using a specific beam direction.

The newly designed energy or interference calculation method includes one of the modes described below:

a base station performs a CCA detection on each beam, and regards the sum of detected energies in respective beam directions as a currently received channel energy; then, the base station compares the currently received channel energy with a channel idle determination threshold to determine whether the current channel is idle; or a base station performs a CCA detection on each beam, and regards an average of detected energies in respective beam directions as a currently received channel energy; then, the base station compares the currently received channel energy with a channel idle determination threshold to determine whether the current channel is idle; or a base station performs a CCA detection on each beam, and regards the maximum value among detected energies in respective beam directions as a currently received channel energy; then, the base station compares the currently received channel energy with a channel idle determination threshold to determine whether the current channel is idle; or a base station performs a CCA detection on each beam, and regards the minimum value among detected energies in respective beam directions as a currently received channel energy; then, the base station compares the currently received channel energy with a channel idle determination threshold to determine whether the current channel is idle.

Based on the detected energy calculation method described above, if the detected energy or interference is not greater than the channel idle determination threshold, the current channel is regarded to be idle, that is, can be used for the transmission of the consecutive SSs/PBCH blocks or SS/PBCH block occasion. Otherwise, if the detected energy or interference is greater than the channel idle determination threshold, the current channel is regarded to be busy, that is, cannot be used for the transmission of the consecutive SSs/PBCH blocks or SS/PBCH block occasion. Alternatively, the current channel is regarded to be busy, and cannot be used for transmission of only the current SS/PBCH block position among consecutive SSs/PBCH blocks or in SS/PBCH block occasion. An idle channel assessment method on the next SS/PBCH block is the same as above. If a channel is idle, remaining SSs/PBCH blocks or SSs/PBCH blocks in the SS/PBCH Block occasion are consecutively transmitted. If the channel is busy, the processing mode is the same as that described above. Optionally, a channel idle determination threshold of an interference or energy value obtained according to the newly designed energy or interference calculation method may be different from or the same as a threshold for determining whether a channel within a single beam is idle.

An SS/PBCH block or SS/PBCH block occasion is actually transmitted by using an original beam direction corresponding to the SS/PBCH block or SS/PBCH block occasion; or sent by selecting a beam direction having the best channel state; or sent by selecting a beam direction having a suboptimal channel state or a middle interference; or transmitted according to a beam corresponding to a union of beams, or a beam corresponding to an intersection of beams.

Mode 3: consecutive SSs/PBCH blocks or SSs/PBCH blocks in an SS/PBCH block occasion are sent by using the same beam or similar beams.

A CCA detection is performed before the start of the consecutive SSs/PBCH blocks or the SS/PBCH block occasion. If a channel is detected to be idle in the CCA detection, the consecutive SSs/PBCH blocks (or the SS/PBCH block occasion) are transmitted by using the same beam. Otherwise, if the channel is detected to be busy in the beam direction, the transmission is abandoned or not performed at a current SS/PBCH block or a current SS/PBCH block position within the SS/PBCH block occasion, or a CCA detection is performed again by using a beam direction after switching or the original beam direction. If a channel is detected to be idle, the consecutive SSs/PBCH blocks (or the SS/PBCH block occasion) are sent according to the beam direction. Otherwise, if the channel is detected to be busy, and the direction is further switched and a detection is continued. The rest is processed in the same way.

A base station may simultaneously perform CCA detections in multiple beam directions, and transmits the SS/PBCH block or SS/PBCH block occasion by using at least one beam where a channel is detected to be idle. Alternatively, the base station performs a CCA detection in a specific beam direction; if a channel is idle in the beam direction, the base station transmits the SS/PBCH block or SS/PBCH block occasion by using the current specific beam direction.

Mode 4: a double CCA determination threshold method is introduced. That is, at least one of that above three modes is used. If it is determined that the received energy is greater than a first preset threshold and less than a second preset threshold, then a current channel is regarded to be idle and can be used to send consecutive SSs/PBCH blocks or SS/PBCH block occasion. The first preset threshold is not greater than the second preset threshold.

For cases where SS/PBCH block occasions use different beams and use the same beam direction, processing modes may refer to the above modes one to four.

In the case where there is a gap between consecutive SSs/PBCH blocks or between SS/PBCH block occasions, the processing mode is different from the above in that if the pre and post SSs/PBCH blocks or SS/PBCH block occasions use different beam directions, an LBT needs to be performed at the gap between the SSs/PBCH blocks or SS/PBCH block occasions. If the pre and post SS/PBCH blocks or SS/PBCH block occasions use the same beam, optionally, the base station may not perform the LBT, or perform a simplified LBT mechanism, or directly send an occupancy signal. The occupancy signal may be at least one of: RMSI, a downlink reference signal, downlink data, uplink control information, an uplink reference signal, measurement feedback information or uplink data. The CCA or LBT is performed in the same way as modes 1 to 4 above.

Optionally, the base station performs a CCA detection before the start of the first SS/PBCH block or SS/PBCH block occasion by using the first preset threshold. If a channel is detected to be idle in the CCA detection, the SS/PBCH block transmission is performed at a current position. If the channel is detected to be busy, the CCA threshold is increased, the busy and idle status of the current channel is re-assessed according to the second preset threshold. Alternatively, if the channel is detected to be busy, the beam direction is switched, and it is determined whether the current channel status satisfies the first preset threshold. If the channel is determined to be idle, the transmission is performed. Otherwise, the processing mode is the same as that described above. The rest is processed in the same way. In the case where a CCA detection or transmission of the first SS/PBCH block succeeds, then the following operation is not performed at a gap before the second SS/PBCH block: performing no CCA detection, or performing a simplified CCA detection, or determining a busy and idle status of a current channel by using the second preset threshold, or directly sending an occupancy signal. The occupancy signal may be at least one of: RMSI, a downlink reference signal, downlink data, uplink control information, an uplink reference signal, measurement feedback information or uplink data.

Consecutive SSs/PBCH blocks have gaps therebetween or SSs/PBCH blocks in the SS/PBCH block occasion may use different transmission beam directions. In view of this, optionally, a simplified CCA detection, or a CCA detection using the second preset threshold for determination may be performed before the SS/PBCH block transmission after the first SS/PBCH block. The first preset threshold is not greater than the second preset threshold.

Optionally, CCA detections are simultaneously performed in beam directions for transmission before the start of the first SS/PBCH block or SS/PBCH block occasion. If the number of beams where channels are detected to be idle is greater than 1, the transmission is performed by selecting a beam direction having the best channel state, or a beam direction having a suboptimal channel state or a middle interference, by randomly selecting a beam from beams detected to be idle, or by using a beam corresponding to the first SS/PBCH block if beams assessed to be idle includes the beam; or the transmission is simultaneously performed on beams detected to be idle. If the number of beams where channels are detected to be idle is 1, the SS/PBCH block transmission is performed by using the beam direction. Transmission of a subsequent SS/PBCH block is precessed in the same way as the previous SS/PBCH block, or uses a detection threshold greater than a CCA detection threshold of the previous SS/PBCH block to perform a channel busy/idle assessment, or uses a CCA simpler than that used by the previous SS/PBCH block. The simpler CCA includes a simplified CCA mechanism, and/or a parameter or a parameter range related to the CCA detection. Other processing modes are similar to the processing modes without the gap above.

Embodiment Four

An embodiment provides a specific implementation for increasing the occasion of SS/PBCH block transmission.

In a scenario of an unlicensed carrier or a competitive use on spectrum resources, some resource transmission of an equipment has opportunistic features due to LBT operations, which to some extent causes resources wastes. Based on this, this embodiment provides a method for increasing SSs/PBCH blocks. Specifically, the method includes at least one of the modes described below.

Mode 1: the number of SS/PBCH block positions within a time window for the SS/PBCH block transmission is increased. The number of SS/PBCH block positions within a time window for the SS/PBCH block transmission on the unlicensed carrier is denoted as L'. Optionally, L'=M+Ni. M may denote the number of SS/PBCH block positions configured on a licensed carrier. Ni denotes an increment. Ni has different values according to different subcarrier spacing and/or different frequency bands.

For example, in view of 3 GHz, 4 SS/PBCH block positions are configured within 5 ms according to an existing NR design, and the number L' of SS/PBCH block positions in NR-U is 4+N1. In view of 15 kHz SCS, if there are two SS/PBCH block positions in a subframe, the range of N1 is [0, 8], or the range of L' is [4, 10]. In view of 30 kHz SCS, if there are 4 SS/PBCH block positions in a subframe, the range of N1 is [0, 16], or the range of L' is [4, 16]. In view of 3 GHz~6 GHz, 8 SS/PBCH block positions are configured within 5 ms, and the number L' of SS/PBCH block positions in NR-U is 8+N2. In view of the 15 kHz SCS, if there are two SS/PBCH block positions in the subframe, the range of N2 is [0, 2], or the range of L' is [8, 10]. In view of the 30 kHz SCS, if there are 4 SS/PBCH block positions in the subframe, the range of N1 is [0, 12], or the range of L' is [8, 20]. In view of SCS greater than 6 GHz, 64 SS/PBCH block positions are configured within 5 ms, and the number L' of SS/PBCH block positions in NR-U is 64+N3. N1, N2 and N3 are positive integers greater than or equal to 0.

L', N1, N2 and N3 may be determined through at least one of the following modes: predefinition, physical layer DCI signaling, high layer RRC signaling, MAC signaling, any combination thereof, or subcarrier spacing and/or a carrier frequency.

Optionally, the time window for the SS/PBCH block transmission is a half subframe, that is, 5 ms. The time window for the SS/PBCH block transmission is a half frame positioned in an SS/PBCH block burst set. The start position of the time window for the SS/PBCH block transmission within the SS/PBCH block burst set may be an offset from the start of the SS/PBCH block burst set. The minimum value of the offset is zero. Optionally, the maximum value may be the size of the SS/PBCH block burst set—the size of the time window for the SS/PBCH block transmission.

Mode 2: the length of a time window for the SS/PBCH block transmission is increased. For example, the length of a time window for the SS/PBCH block transmission on a licensed carrier is 5 ms (that is, a half frame); and for the unlicensed carrier, the size of a time window for the SS/PBCH block transmission may be a positive integer not less than 5 ms and not greater than the period size of an SS/PBCH block burst set. The SS/PBCH block burst set is {5 ms, 10 ms, 20 ms, 40 ms, 80 ms, 160 ms}. The size of the time window for the SS/PBCH block transmission is determined through at least one of the following modes: predefinition, physical layer DCI signaling, high layer RRC signaling, MAC signaling, or any combination thereof.

Mode 3: an SS/PBCH block burst set having a short period is configured. To some extent, the number of SS/PBCH blocks in a certain time period is increased. Optionally, the period of the SS/PBCH block burst set may be configured to one of (y/x) ms, 1 ms, 2 ms, 3 ms, 4 ms, 5 ms, 10 ms, 20 ms, 40 ms, 80 ms or 160 ms. y is not greater than x. x and y are positive integers greater than 0. For the period of the SS/PBCH block burst set less than 5 ms, the corresponding size of the time window for the SS/PBCH block transmission should be a positive integer not greater that the period of the SS/PBCH block burst set.

Additionally, a combination of a short period and a long period may be used, which may be implemented through a semi-static configuration, predefinition, or a dynamic configuration.

Optionally, consecutive SS/PBCH block positions or SS/PBCH block positions having gaps therebetween may be configured outside the time window for the SS/PBCH block transmission to perform the SSB transmission.

Mode 4: one or more SS/PBCH block or SS/PBCH block occasion positions are configured in frequency domain. This mode to some extent alleviates or reduces the problem of insufficient time domain resources caused by an LBT. Optionally, the multiple SS/PBCH block or SS/PBCH block occasion positions configured in the frequency domain use the same beam direction or different beam directions. Frequency domain positions of the SS/PBCH blocks or SS/PBCH block occasions are determined through at least one of the following modes: predefinition, physical layer DCI signaling, high layer RRC signaling, MAC signaling, or any combination thereof.

The case where the same beam is used at different frequency domain positions of SSs/PBCH blocks or SS/PBCH block occasions includes one of the cases described below.

Case 1: a base station simultaneously performs CCA detections in multiple beam directions (including at least a pre-transmission beam direction). If the number of beam directions detected to be idle is greater than 1, frequency domain transmission beam directions corresponding to the SS/PBCH blocks or SS/PBCH block occasions may be determined in at least one of the following manners: randomly selecting a beam direction from idle beams, or selecting a beam having the best channel state, a beam direction having a suboptimal channel state, or a beam direction having a middle channel interference state; or the transmission is simultaneously performed on at least one beam detected to be idle. If there is only one beam detected to be idle, transmissions of the multiple SS/PBCH blocks or SS/PBCH block occasions is performed by using the one beam in the frequency domain. Optionally, to improve the opportunity of the SS/PBCH block or SS/PBCH block occasion transmission, a threshold greater than a conventional CCA determination threshold may be used.

Case 2: a base station performs a CCA detection in a beam direction corresponding to an SS/PBCH block or SS/PBCH block occasion to be transmitted. If the beam is detected to be idle, the transmission is performed in the beam at the frequency domain position for sending the SS/PBCH block or SS/PBCH block occasion. Otherwise, if the beam is detected to be busy, the current transmission is abandoned. Alternatively, if a channel is detected to be busy, the base station switches to another beam direction to perform a CCA detection. If the channel is detected to be idle, the transmission is performed in the switched beam at the frequency domain position for sending the SS/PBCH block or SS/PBCH block occasion. Optionally, to improve the opportunity of the SS/PBCH block or SS/PBCH block occasion transmission, a threshold greater than a conventional CCA determination threshold may be used.

The case where different frequency domain positions of SS/PBCH blocks or SS/PBCH block occasions correspond to different beam directions includes one of the cases described below.

Case 1: a base station simultaneously performs CCA detections in multiple beam directions. The SSB or SSB occasion transmission may be performed at frequency domain positions of SS/PBCH blocks or SS/PBCH block occasions corresponding to beams detected to be idle in the CCA detections, and is not performed at SS/PBCH block or SS/PBCH block occasion positions corresponding to beams where the CCAs fail. Alternatively, the transmission is performed in detected idle beam directions at the SSB or SSB occasion positions corresponding to the beams where the CCAs fail. Since the same beam may correspond to different interference statuses due to different frequency domain positions, optionally, a simplified CCA may be performed before the transmission using a beam where a channel is detected to be idle, or a threshold greater than a conventional CCA determination threshold value may be used.

Case 2: a base station simultaneously performs CCA detections in multiple beam directions. If the interference in each beam is not greater than a first preset threshold, or greater than the first preset threshold and less than a second preset threshold, then a channel is regarded to be idle in a current beam direction. If the interference in each beam is greater than the first preset threshold, or greater than the second preset threshold, then the channel is regarded to be busy in the current beam direction, and the current transmission corresponding to the SSB direction is abandoned, or the beam direction is switched to re-perform a CCA detection. If the interference in the beam satisfies the above conditions, the channel is regarded to be idle. Otherwise, the channel is busy, the transmission is abandoned, or the beam direction is switched to re-perform a detection. The rest can be processed in the same way.

Case 3: CCA detections are simultaneously performed in multiple beam directions on each SS/PBCH block or SS/PBCH block occasion in the frequency domain. On each SS/PBCH block or SS/PBCH block occasion, if a beam where a channel is detected to be idle exists among the multiple beams, then the transmission is performed by randomly selecting a beam direction, a beam having the best channel state, a beam direction having a suboptimal channel state, or a beam direction having a middle channel interference status from the idle beams; or the transmission is simultaneously performed on at least one of the beams detected to be idle. If there is only one beam detected to be idle, the transmission is performed by using the beam. If CCA detections fail on the multiple beams, the SSB or SSB occasion transmission is abandoned at the frequency domain position. Optionally, a double threshold mode may be introduced into a CCA determination threshold. For example, if the interference within a beam is not greater than the first preset threshold, or is greater than the first preset threshold and less than the second preset threshold, then a channel is regarded to be idle in the current beam direction. If the interference within the beam is greater than the first preset threshold or greater than the second preset threshold, then the channel is regarded to be busy in the current beam direction.

Embodiment Five

An embodiment provides a specific processing method for an SS/PBCH block transmission failure.

At least one of the processing modes described below may be used in the case where SS/PBCH block transmission cannot be performed since an LBT fails or a channel is detected to be busy in a CCA detection.

Mode 1: if a CCA detection fails at a current SS/PBCH block or SS/PBCH block occasion position, then a base station abandons the SSB transmission at the current SS/PBCH block or SS/PBCH block occasion position. The SS/PBCH block or SS/PBCH block occasion transmission is reattempted at an SS/PBCH block or SS/PBCH block occasion position after all the SS/PBCH block or SS/PBCH block occasion transmission is completed. Optionally, in the case where the SS/PBCH block or SS/PBCH block occasion transmission is performed in a beam mode, SS/PBCH block or SS/PBCH block occasion retransmission is performed in the original beam mode. For example, if SS/PBCH blockkindex #1 is not transmitted since the LBT fails, then a CCA detection is performed in the original beam direction in retransmission of the SSB index. If the CCA detection succeeds, the transmission on the current SS/PBCH block or SS/PBCH block occasion is performed by using this beam direction. If the CCA detection fails, the current transmission is abandoned. A CCA detection is re-performed in the original beam direction at a next SS/PBCH block or SS/PBCH block occasion position, and the processing mode is the same as that described above. Optionally, if the current CCA detection fails, the current transmission is abandoned. The transmission of this SS/PBCH block index is reattempted until all the SS/PBCH block indexes to be retransmitted are polled once.

Optionally, a base station simultaneously performs CCA detections in retransmission beam directions at retransmission positions of SS/PBCH blocks or SS/PBCH block occasions. The SS/PBCH block or SS/PBCH block occasion transmission is performed by using at least one beam detected to be idle, by randomly selecting a beam direction, or by selecting a beam having the best channel state, a beam direction having a sub-optimal channel state, or a beam direction having a middle channel interference state.

Mode 2: if a CCA of a base station fails at a current SS/PBCH block or SS/PBCH block occasion position, then the base station reattempts a CCA detection at a next SS/PBCH block or SS/PBCH block occasion position, or at a next SS/PBCH block position within the SS/PBCH block occasion. If the CCA detection succeeds, the SS/PBCH block transmission is performed at the current SS/PBCH block position. Otherwise, the transmission is reattempted at the next SS/PBCH block position. The rest can be processed in the same way. Optionally, in the case where the SS/PBCH block or SS/PBCH block occasion transmission is performed in a beam mode, SS/PBCH block or SS/PBCH block occasion retransmission is performed in the original beam mode.

Optionally, the base station simultaneously performs CCA detections in beam retransmission directions at retransmission positions of SS/PBCH blocks or SS/PBCH block occasions. The SS/PBCH block or SS/PBCH block occasion transmission is performed by using at least one beam detected to be idle, by randomly selecting a beam direction, or by selecting a beam having the best channel state, a beam direction having a sub-optimal channel state, or a beam direction having a middle channel interference status.

Mode 3: if a CCA of a base station fails in a beam corresponding to a current SS/PBCH block or SS/PBCH block occasion position, then the base station switches the beam to re-perform a CCA detection. If a channel is detected to be idle within the switched beam, the SS/PBCH block or SS/PBCH block occasion transmission is performed at the current position by using the switched beam. If the channel is detected to be busy or the CCA detection fails in the switched beam, the base station switches the beam to re-perform a CCA detection. The rest can be processed in the same way.

Mode 4: if a CCA detection of a base station fails within a beam corresponding to a current SS/PBCH block or SS/PBCH block occasion position, then CCA detections are simultaneously performed at the next SS/PBCH block or SS/PBCH block occasion position by using multiple beams. If the original beam is detected to be idle in a current CCA detection, the SS/PBCH block or SS/PBCH block occasion transmission is performed by using the original beam. Alternatively, if the original beam is detected to be busy in the current CCA detection, the SS/PBCH block or SS/PBCH block occasion transmission is performed by randomly selecting a beam, or selecting a beam direction having the best channel state, a beam direction having a sub-optimal channel state, or a beam direction having a middle channel interference state from the idle beams, or the SS/PBCH block or SS/PBCH block occasion transmission is simultaneously performed in beam directions detected to be idle.

Figure 2:
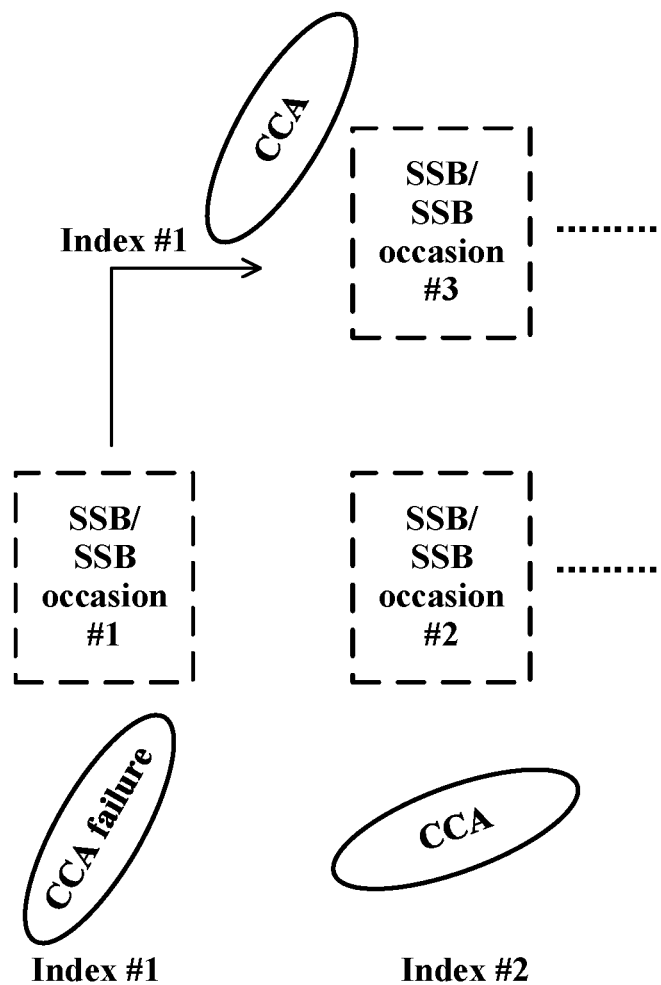
FIG. 2 is a schematic diagram of retransmission at a frequency domain position according to mode 5 of embodiment five.

Mode 5: if a CCA detection of a base station fails on a beam corresponding to a current SS/PBCH block or SS/PBCH block occasion position, the base station attempts retransmission on other SS/PBCH block or SS/PBCH block occasion resources in frequency domain at a next SS/PBCH block or SS/PBCH block occasion position. Optionally, the beam direction is the same as that of the previous SS/PBCH block or SS/PBCH block occasion position. As shown in FIG. 2, the base station simultaneously performs CCA detections in beam indexes #1 and 2 directions. If a channel is detected to be idle, the base station performs the transmission at the current frequency domain position of the SS/PBCH block or SS/PBCH block occasion by using the beam direction. If the CCA detection fails within at least one beam, the processing mode is the same as that described above. Optionally, a CCA detection threshold is increased, or a CCA detection success rate is increased through a double detection.

Figure 3:
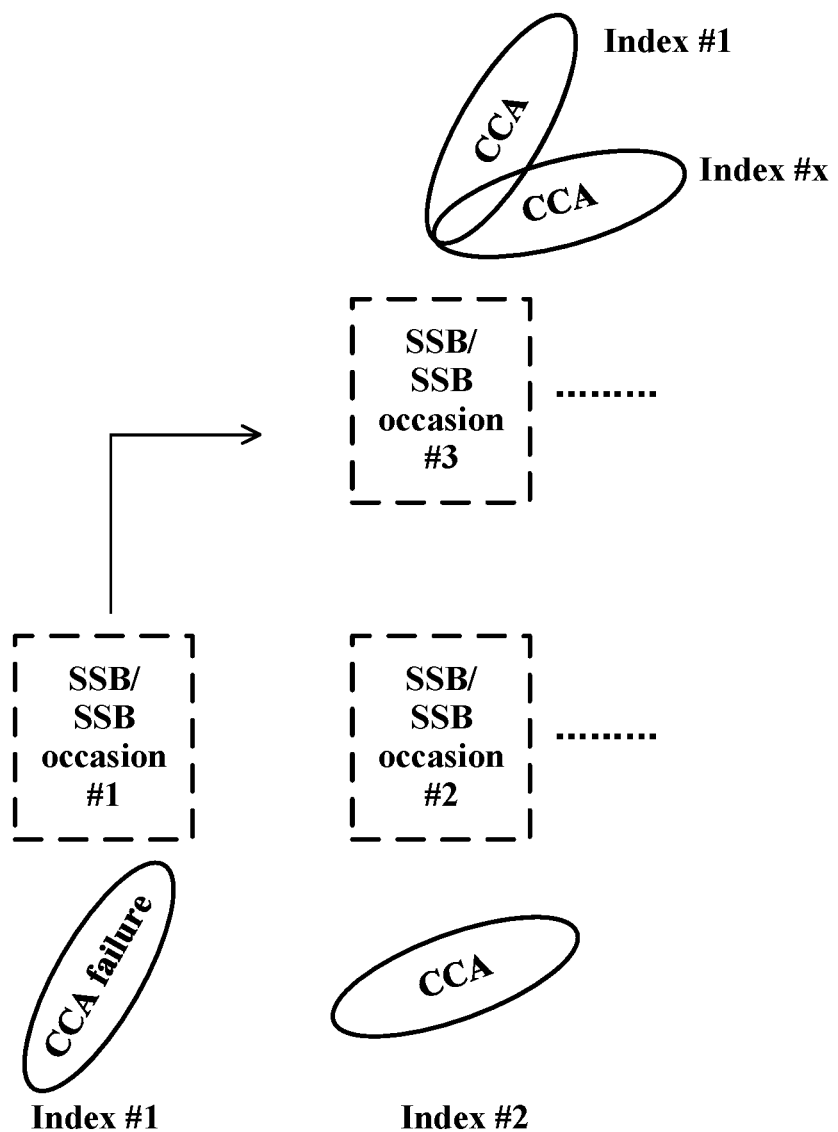
FIG. 3 is a schematic diagram of retransmission at a frequency domain position according to mode 6 of embodiment five.

Mode 6: if a CCA detection of a base station fails on a beam corresponding to a current SS/PBCH block or SS/PBCH block occasion position, the base station attempts retransmission on other SS/PBCH block or SS/PBCH block occasion resources in frequency domain at a next SS/PBCH block or SS/PBCH block occasion position. Optionally, CCA detections are simultaneously performed at a current retransmission position of an SS/PBCH block or SS/PBCH block occasion by multiple beams. As shown in FIG. 3, the base station simultaneously performs CCA detections in beam index #1, 2, . . . and x directions. If CCA detections succeed in multiple beams at the position of SS/PBCH block or SS/PBCH block occasion #3. If beams detected to be idle include the original beam, the transmission is optionally performed by using the original beam direction. If the beams detected to be idle do not include the original beam, the transmission is performed by randomly selecting beam direction, or selecting a beam direction having the best channel state, a beam direction having a sub-optional channel state, or a beam direction having a middle channel interference state, or the SS/PBCH block or SS/PBCH block occasion transmission is simultaneously performed in beam directions detected to be idle. If CCA detections fail on all beams at the position of SS/PBCH block or SS/PBCH block occasion #3, then the current transmission is abandoned and transmission is reattempted on frequency domain resources corresponding to a next time domain resource. The processing mode is the same as that described above. If a CCA detection on a beam at the position of SS/PBCH block or SS/PBCH block occasion #3 succeeds, then the SS/PBCH block or SS/PBCH block occasion transmission is performed on the current resource. Otherwise, the processing mode in the case where the CCA detection fails within the beam is used.

Figure 4:
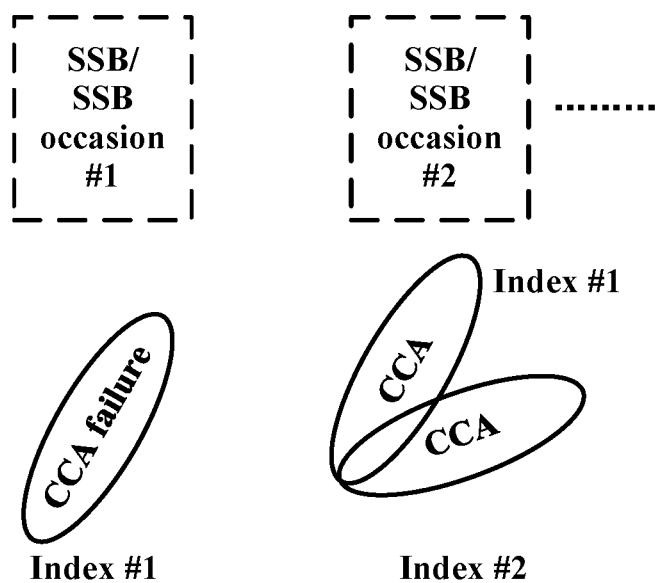
FIG. 4 is a schematic diagram of retransmission according to mode 7 of embodiment five.

Mode 7: if a CCA detection of a base station fails within a beam corresponding to a current SS/PBCH block or SS/PBCH block occasion position, then at a next SS/PBCH block occasion position, the base station needs to not only simultaneously perform CCA detections on beams corresponding to the current SS/PBCH block or SS/PBCH block occasion position, but also re-perform a CCA detection in the beam direction where the previous CCA detection fails. If CCA detections succeed in two beam directions, the SS/PBCH block or SS/PBCH block occasion transmission is performed in both the two beam directions. If a CCA detection fails in at least one of the two beam directions, then at a next SS/PBCH block occasion position, the base station needs to not only simultaneously perform CCA detections on beams corresponding to the current SS/PBCH block or SS/PBCH block occasion position, but also re-perform a CCA detection in the at least one of the two beam directions where the previous CCA detection fails. The rest can be processed in the same way. The specific processing mode is as shown in FIG. 4.

Mode 8: if a CCA detection of a base station fails within a beam corresponding to a current SS/PBCH block or SS/PBCH block occasion position, then a next position for reattempting SS/PBCH block or SS/PBCH block occasion retransmission is determined according to the value of an offset parameter. If SS/PBCH block or SS/PBCH block occasion transmission is performed in a beam mode, then the base station performs a CCA detection in an original beam direction at a time-frequency position of the retransmission. The offset may be based on the SS/PBCH block or SS/PBCH block occasion position, or in units of symbols. The offset may be acquired through the following mode: predefinition, physical layer DCI signaling, high layer RRC signaling, MAC signaling, and any combination thereof.

Mode 9: if a CCA detection of a base station fails at a current SS/PBCH block or SS/PBCH block occasion position, then transmission is performed at other frequency domain positions corresponding to the current SS/PBCH block or SS/PBCH block occasion position. Optionally, the base station needs to simultaneously perform CCA detections in the same beam direction or different beam directions at multiple frequency domain positions. The base station performs the transmission only at a frequency domain position corresponding to a beam detected to be idle.

At least one of the frequency domain position of an SS/PBCH block or SS/PBCH block occasion, or the time domain position, the frequency domain position or the beam direction of SS/PBCH block or SS/PBCH block occasion retransmission is determined through at least one of the following modes: predefinition, physical layer DCI signaling, high layer RRC signaling, MAC signaling, or any combination thereof.

The UE may be notified, through physical layer DCI signaling, high layer RRC signaling, MAC signaling, and any combination thereof, of at least one of the time domain position, the frequency domain position or the beam direction of the SS/PBCH block or the SS/PBCH block occasion initial transmission or retransmission.

Embodiment Six

An embodiment provides a method for enable an SS/PBCH block or SS/PBCH block occasion (where the SS/PBCH block occasion refers to an SSB transmission occasion in frequency domain) to satisfy the regulation requirements for an occupied bandwidth of an unlicensed carrier.

Figure 5:
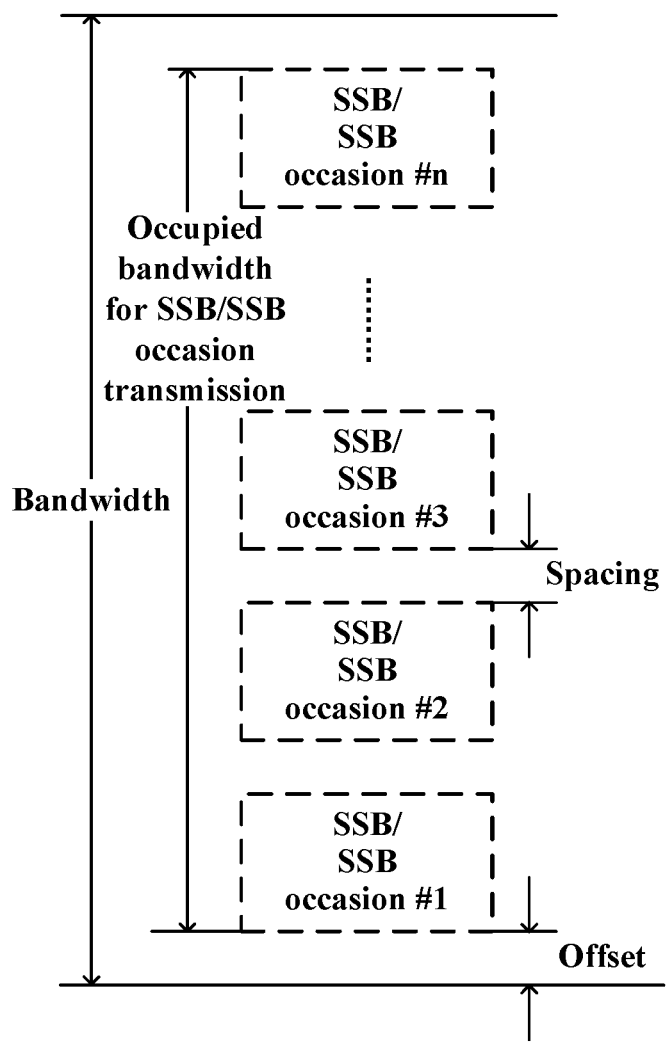
FIG. 5 is a schematic diagram of a bandwidth regulation according to mode 1 of embodiment six.

Mode 1: the SS/PBCH block or SS/PBCH block occasion is transmitted as a whole for n times in frequency domain. A frequency domain start point of the SS/PBCH block or SS/PBCH block occasion is determined by a frequency domain offset. The minimum value of the offset may be 0. The granularity of the offset is an RBG, an RB or an RE. SSBs may be consecutive or equally spaced, as shown in FIG. 5.

The frequency domain start position (or frequency domain offset) of the SS/PBCH block, the repetition times of the SS/PBCH block, SS/PBCH block spacing, and a frequency domain RB level pattern of the SS/PBCH block are determined through at least one of the following mode: predefinition, physical layer DCI signaling, high layer RRC signaling, MAC signaling or a bitmap.

Figure 6:
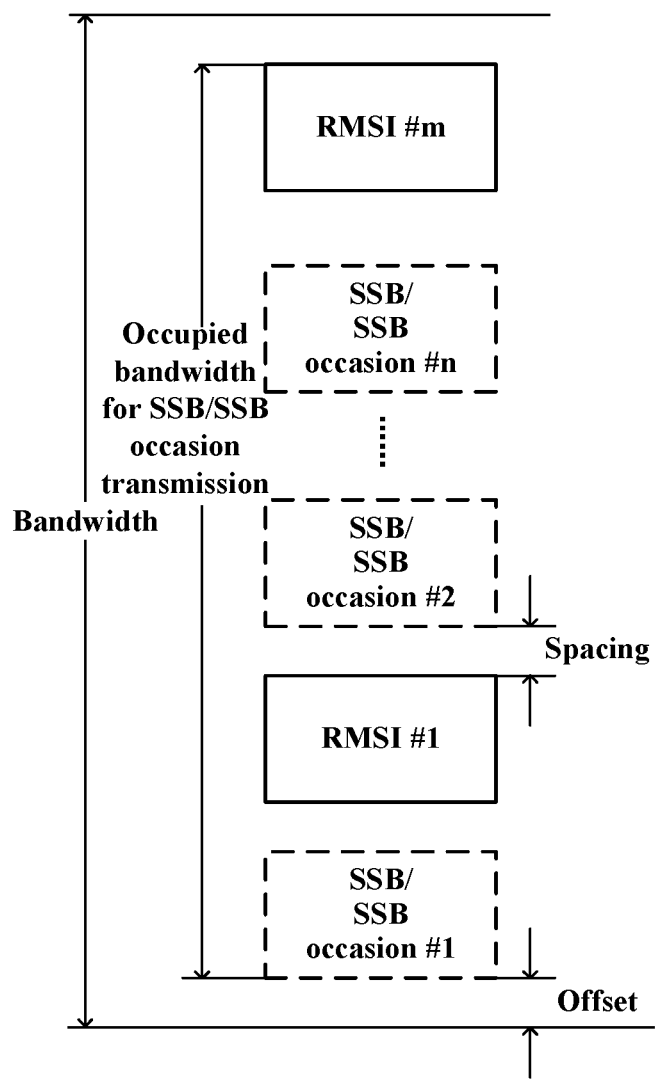
FIG. 6 is a schematic diagram of a bandwidth regulation according to mode 2 of embodiment six.

Mode 2: the SS/PBCH block is transmitted as a whole alternately with RMSI in frequency domain. This satisfies the requirements of the occupied bandwidth of the unlicensed carrier. The SS/PBCH block or SS/PBCH block occasion may be either before or after the RMSI. A frequency domain start point of the SS/PBCH block or SS/PBCH block occasion is determined by a frequency domain offset. The minimum value of the offset may be 0. The granularity of the offset is an RBG, an RB or an RE. SSBs may be consecutive or equally spaced, as shown in FIG. 6.

The frequency domain start position (or frequency domain offset) of the SS/PBCH block, the repetition times of the SS/PBCH block, SS/PBCH block spacing, a frequency domain start position (or frequency domain offset) of the RMSI, the repetition times of the RMSI, RMSI spacing, a frequency domain RB level pattern of the SS/PBCH block, and a frequency domain RB level pattern of the RMSI are determined through at least one of the following modes: predefinition, physical layer DCI signaling, high layer RRC signaling, MAC signaling or a bitmap.

Figure 7:
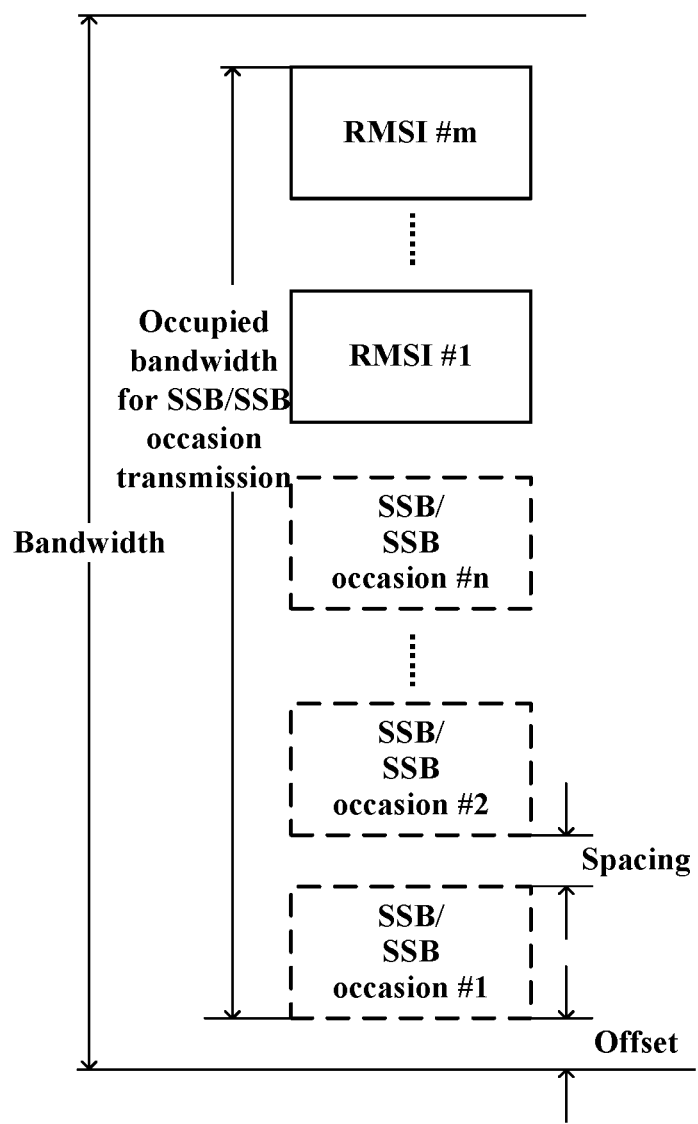
FIG. 7 is a schematic diagram of a bandwidth regulation according to mode 3 of embodiment six.

Mode 3: the SS/PBCH block or SS/PBCH block occasion is transmitted as a whole for n times in the frequency domain. Then, RMSI is repeated for m times in the frequency domain. It is also feasible to transmit the RMSI for n times and then transmit the SS/PBCH block or SS/PBCH block occasion for m times. A frequency domain start point of the SS/PBCH block or SS/PBCH block occasion is determined by a frequency domain offset. The minimum value of the offset may be 0. The granularity of the offset is an RBG, an RB or an RE. SSBs may be consecutive or equally spaced, as shown in FIG. 7.

The frequency domain start position (or frequency domain offset) of the SS/PBCH block, the repetition times of the SS/PBCH block, SS/PBCH block spacing, a frequency domain start position (or frequency domain offset) of the RMSI, the repetition times of the RMSI, RMSI spacing, a frequency domain RB level pattern of the SS/PBCH block, and a frequency domain RB level pattern of the RMSI are determined through at least one of the following modes: predefinition, physical layer DCI signaling, high layer RRC signaling, MAC signaling or a bitmap.

Figure 8:
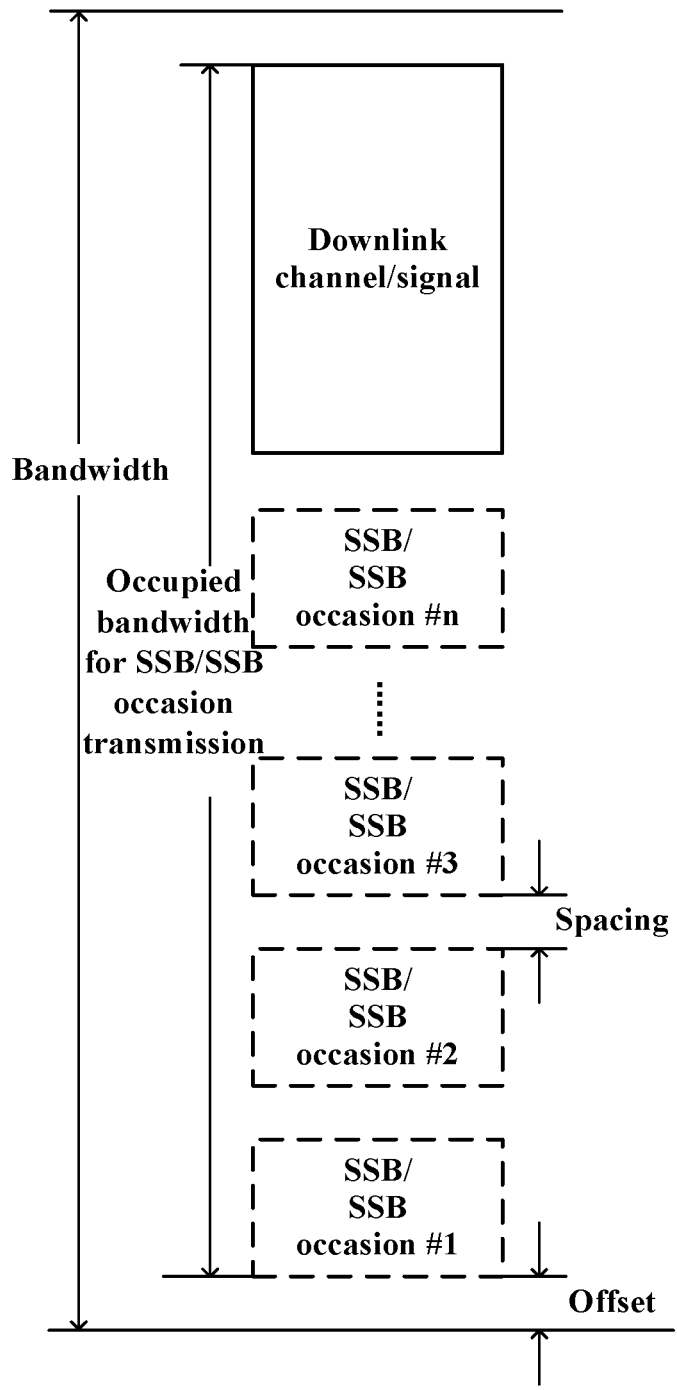
FIG. 8 is a schematic diagram of a processing mode of first retransmission and then downlink channel/signal transmission according to mode 4 of embodiment six.
Figure 9:
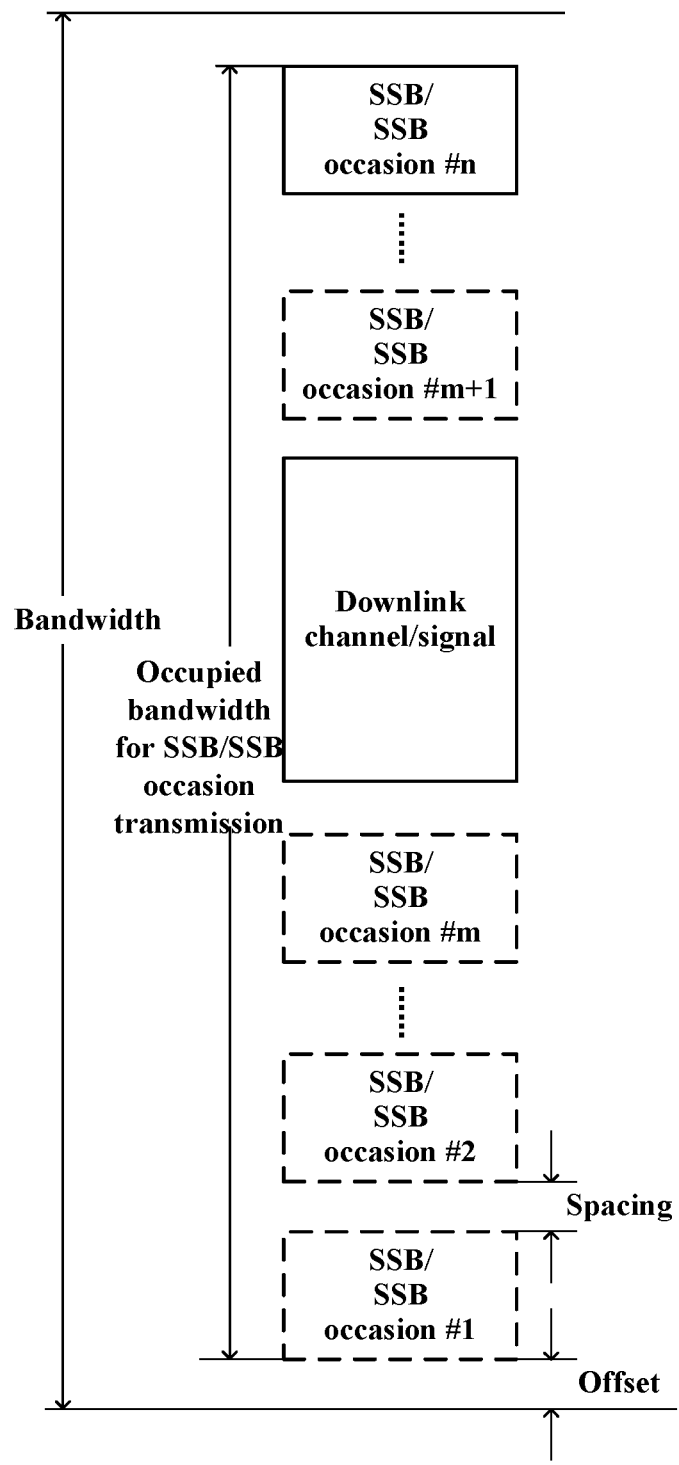
FIG. 9 is a schematic diagram of a processing mode of first transmission, then downlink channel/signal transmission, and then retransmission according to mode 4 of embodiment six.

Mode 4: the SS/PBCH block or SS/PBCH block occasion and a downlink channel/signal are multiplexed. This satisfies OCB requirements. The downlink channel or signal may be positioned on two sides, one side or the middle of a channel. As shown in FIG. 8, the SS/PBCH block or SS/PBCH block occasion is repeatedly transmitted for n times in the frequency domain, and then the downlink channel or signal is transmitted, thus satisfying the requirement of occupying at least 80% of a bandwidth. As shown in FIG. 9, in the frequency domain, m SS/PBCH blocks or SS/PBCH block occasions are firstly transmitted, then downlink channels/signals are transmitted, after that, SS/PBCH blocks or SS/PBCH block occasions are transmitted again, thus satisfying the requirement of occupying at least 80% of the bandwidth.

A frequency domain start position (or frequency domain offset) of the SS/PBCH block, the repetition times of the SS/PBCH block, SS/PBCH block spacing, and a frequency domain RB level pattern of the SS/PBCH block are determined through at least one of the following modes: predefinition, physical layer DCI signaling, high layer RRC signaling, MAC signaling or a bitmap.

Mode 5: SS/PBCH blocks are mapped according to certain spacing to finally obtain a whole SS/PBCH block. Assuming that the bandwidth is B1 and corresponds to B2 RBs and B2*12 subcarriers. The B2*12 subcarriers are divided into P1 clusters. Each group includes B2*12/P1 subcarriers. Each cluster includes 240/P1 SS/PBCH block positions. In each cluster, SS/PBCH blocks are mapped on 240/P1 subcarriers having corresponding numbers. If the number of subcarriers corresponding to the bandwidth cannot be divided by the number of subcarriers occupied by the SS/PBCH block, extra subcarriers are reserved on two sides of the bandwidth (in the case where reserved subcarriers on the two sides are an average of remaining carriers or cannot be divisible, subcarriers greater than half of the extra subcarriers are placed on a low frequency or high frequency side, while subcarriers equal to half of the extra subcarriers are placed on the other side) or placed at a low frequency position or a high frequency position.

A frequency domain start position of the SS/PBCH block, RE spacing, a start point of a subcarrier cluster in the SS/PBCH block, an end point of the cluster, the size of the cluster, and a frequency domain RE pattern of the SS/PBCH block are determined through at least one of the following modes: predefinition, physical layer DCI signaling, high layer RRC signaling, MAC signaling or a bitmap.

For example, the bandwidth is 20 MHz and corresponds to 100 PRBs and 1200 subcarriers. The SS/PBCH block occupies 20 RBs in frequency domain. On a first symbol, a PSS occupies subcarrier indexes #56 to 183, with a total of 127 subcarriers. On a second symbol, a PBCH occupies subcarriers indexes #0 to 240, with a total of 240 subcarriers. On a third symbol, an SSS occupies subcarriers indexes #56 to 183, with a total of 127 subcarriers; a PBCH occupies subcarriers indexes #0 to 48 and #192 to 240; and a fourth PBCH occupies subcarriers indexes #0 to 240, with a total of 240 subcarriers.

The 1200 subcarriers are divided into 240 clusters. SS/PBCH blocks may be mapped at positions corresponding to indexes 0, 1, 2, 3 or 4 in each cluster. Alternatively, the 1200 subcarriers are divided into 120 clusters, and each cluster includes 10 subcarriers, then corresponding indexes in each cluster are {0, 5}, {1, 6}, {2, 7}, {3, 8} or {4, 9}. Alternatively, the 1200 subcarriers are divided into 60 clusters, and each cluster includes 20 subcarriers, then corresponding indexes in each cluster are {0, 5, 10, 15}, {1, 6, 11, 16}, {2, 7, 12, 17}, {3, 8, 13, 18} or {4, 9, 14, 19}. The rest is processed in the same way.

It can be summarized as follows: assuming that the total number of subcarriers is Z1, the number of clusters is Z2, and the number of subcarriers included in each cluster is rounded (Z1/Z2). The number of SS/PBCH blocks mapped in each cluster is rounded (240/Z2). Mapped SS/PBCH block positions in each cluster are equally spaced.

Embodiment Seven

Figure 10:
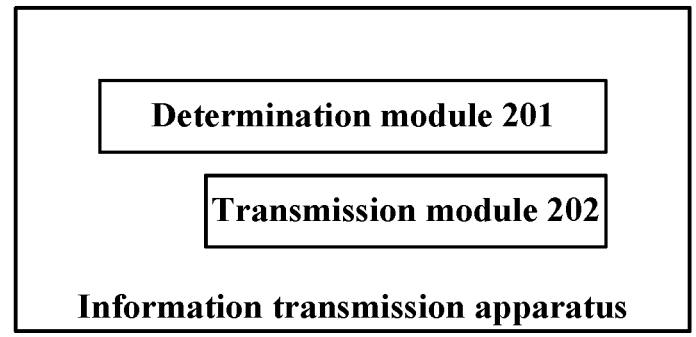
FIG. 10 is a system block diagram of an information transmission apparatus according to embodiment seven of the present disclosure.

To solve the problem of effective information transmission, an embodiment provides an information transmission apparatus. Referring to FIG. 10, the apparatus includes a determination module 201 and a transmission module 202.

The determination module 201 is configured to determine at least one of a time domain position, a frequency domain position or a spatial domain position for transmitting information. Information includes a signal and/or a channel.

The transmission module 202 is configured to perform transmission of the information at the at least one of the time domain position, the frequency domain position or the spatial domain position of the information transmission determined by the determination module 201.

The apparatus may implement the functions of all the steps of the information transmission method provided by the present disclosure.

Embodiment Eight

Figure 11:
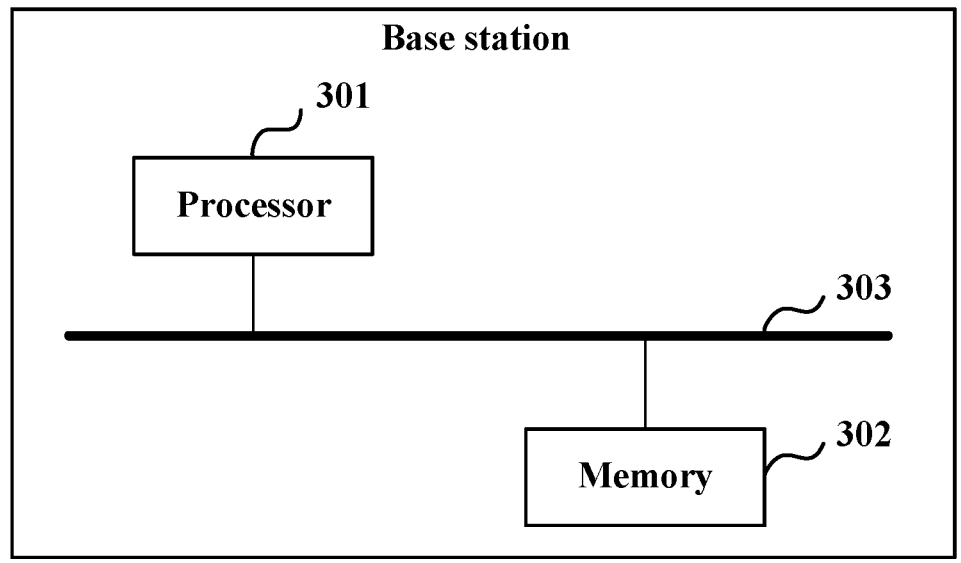
FIG. 11 is a system block diagram of a base station according to embodiment eight of the present disclosure.

To solve the problem of effective information transmission, an embodiment provides a base station. FIG. 11 is a system block diagram of a base station according to this embodiment of the present disclosure. Referring to FIG. 11, the base station includes a processor 301, a memory 302 and a communication bus 303.

The communication bus 303 is configured to implement a connection communication between the processor 301 and the memory 302.

The processor 301 is configured to execute one or more programs stored in the memory 302 to perform the steps of the information transmission methods of the embodiments described above.

The base station may implement the functions of the steps of the information transmission methods provided by the embodiments of the present disclosure.

Embodiment Nine

To solve the problem of effective information transmission, an embodiment provides a computer-readable storage medium. The computer-readable storage medium stores one or more programs executable by one or more processors, so as to perform the information transmission methods of the embodiments described above.

The computer-readable storage medium may implement the functions of the steps of the information transmission methods provided by the embodiments of the present disclosure.

Apparently, it is to be understood by those skilled in the art that each of the modules or steps in the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage medium (such as a read-only memory (ROM)/random access memory (RAM), a magnetic disk or an optical disk) and executed by the computing apparatuses. Moreover, in some circumstances, the illustrated or described steps may be performed in sequences different from those described herein, or the modules or steps may be made into various integrated circuit modules separately, or multiple modules or steps therein may be made into a single integrated circuit module for implementation. Therefore, the present disclosure is not limited to any specific combination of hardware and software.

The preceding is a more detailed description of embodiments of the present disclosure in conjunction with implementations. The description is not intended to limit embodiments of the present disclosure. For those skilled in the art to which the present disclosure pertains, a number of simple deductions or substitutions not departing from the concept of the present disclosure may be made and should fall within the scope of the present disclosure.

INDUSTRIAL APPLICABILITY

The present disclosure relates to the field of communications. The solution of the present disclosure establishes a complete and effective information transmission mechanism. The mechanism is applicable to at least one of a licensed spectrum, an unlicensed spectrum, a shared spectrum, or various available spectra and, especially, to the unlicensed spectrum.

What is claimed is:

1. An information transmission method, comprising:
   determining at least one of a time domain position, a frequency domain position or a spatial domain position for transmitting information, wherein the information comprises a signal and/or a channel; and
   performing transmission of the information at the determined at least one of the time domain position, the frequency domain position or the spatial domain position for transmitting the information;
   wherein enabling an SS/PBCH block to satisfy a requirement for an occupied channel bandwidth in an unlicensed spectrum in frequency domain comprises at least one of:
   transmitting the SS/PBCH block as a whole for multiple times;
   transmitting the SS/PBCH block as a whole alternately with remaining minimum system information (RMSI) in the frequency domain;
   transmitting the SS/PBCH block as a whole and RMSI respectively for multiple times in the frequency domain;
   multiplexing and transmitting the SS/PBCH block and a downlink channel/signal in a manner of frequency division multiplexing (FDM); or
   transmitting the SS/PBCH block in the frequency domain by using a resource element (RE)-level resource allocation mode; and
   wherein the RE-level resource allocation mode of the SS/PBCH block comprises one of:
   assuming that a bandwidth is B1 and corresponds to B2 resource blocks (RBs) and B2*12 subcarriers, dividing the B2*12 subcarriers into P1 clusters, wherein each cluster comprises B2*12/P1 subcarriers, each of the P1 clusters comprises 240/P1 SS/PBCH block positions, and the SS/PBCH block is mapped at a position having a corresponding number in each of the P1 cluster.

2. The information transmission method of claim 1, wherein before performing the transmission of the information at the determined at least one of the time domain position, the frequency domain position or the spatial domain position for transmitting the information, the information transmission method comprises performing a clear channel assessment (CCA)/listen-before-talk (LBT) detection, or performing a beam-based CCA/LBT detection.

3. The information transmission method of claim 1, wherein performing the transmission of the information at the determined at least one of the time domain position, the frequency domain position or the spatial domain position for transmitting the information comprises at least one of:
   performing, by an equipment, a CCA/LBT detection before an information position; in a case where the CCA/LBT succeeds, performing, by the equipment, the transmission of the information at a current information position; and in a case where the CCA/LBT detection fails, abandoning, by the equipment, the transmission of the information at the current information position; or
   performing, by an equipment, CCAs/LBT detections simultaneously at a plurality of frequency domain positions of a time domain position of the information; in a case where a CCA/LBT detection succeeds at at least one of the plurality of frequency domain positions, performing, by the equipment, the transmission of the information at the at least one of the plurality of frequency domain positions of the time domain position of the information; and in a case where the CCA/LBT detections fail at all of the plurality of frequency domain positions, abandoning, by the equipment, the transmission of the information at a current information position.

4. The information transmission method of claim 1, wherein in a case where the transmission of the information is performed by using a directional beam mode, performing the transmission of the information at the determined at least one of the time domain position, the frequency domain position or the spatial domain position for transmitting the information comprises at least one of:
   performing, by an equipment, CCAs/LBT detections simultaneously in a plurality of directional beam directions, and in a case where a channel is detected to be idle in at least one of the plurality of beam directions, performing, by the equipment, the transmission of the information at a current information position by using the at least one of the plurality of beam directions where the channel is detected to be idle;
   performing, by an equipment, a CCA/LBT detection in a specific directional beam direction, and in a case where a channel is detected to be idle in the specific directional beam direction, performing the transmission of the information by using a current directional beam direction;
   performing, by an equipment, CCAs/LBT detections simultaneously in a specific directional beam direction at a plurality of frequency domain positions of an information position, and in a case where a CCA/LBT detection succeeds in a directional beam at at least one of the plurality of frequency domain positions, performing, by the equipment, the transmission of the information at the at least one of the plurality of frequency domain positions by using the specific directional beam direction; or
   performing, by an equipment, CCAs/LBT detections simultaneously in a plurality of directional beam directions at a plurality of frequency domain positions of an information position, and in a case where a CCA/LBT detection succeeds in at least one of a plurality of beams at at least one of the plurality of frequency domain positions, performing, by the equipment, the transmission of the information at the at least one of the plurality of frequency domain positions by using the at least one of the plurality of beams where a channel is detected to be idle.

5. The information transmission method of claim 1, wherein in a case where a CCA/LBT detection performed by an equipment fails before a current information transmission position, the information transmission method further comprises at least one of following processing modes:

re-performing, by the equipment, a CCA/LBT detection at an information position after a first attempt of transmission of all information to be transmitted is completed; in a case where a channel is detected to be idle, performing retransmission of the information at the current information position; in a case where the channel is detected to be busy, abandoning the retransmission of the information at the current information position; and in next retransmission of the information, re-performing a CCA/LBT detection at a next information position or a position after retransmission of information to be retransmitted is completed once, and attempting the retransmission of the information;

reattempting, by the equipment, a CCA/LBT detection at a next information position; in a case where a channel is detected to be idle, performing retransmission of the information at the current information position; in a case where a channel is detected to be busy, abandoning the retransmission of the information at the current information position; and at a further next information position, reattempting a CCA/LBT detection continuously, and attempting the retransmission of the information;

reattempting, by the equipment, a CCA/LBT detection at a specific frequency domain position of a next information position; in a case where a channel is detected to be idle, performing retransmission of the information at the frequency domain position of the current information position detected to be idle; and in a case where the channel is detected to be busy, using the preceding processing mode; or reattempting, by the equipment, CCAs/LBT detections at a plurality of frequency domain positions of a next information position; in a case where a channel is detected to be idle at at least one of the plurality of frequency domain positions, performing retransmission of the information at the at least one of the plurality of frequency domain positions of the current information position detected to be idle; and in a case where the channel is detected to be busy, using the preceding processing mode.

6. The information transmission method of claim 1, wherein in a case where a CCA/LBT detection of an equipment fails before a current information transmission position, the information transmission method further comprises at least one of following processing modes:

switching, by the equipment, a directional beam direction, and reattempting a CCA/LBT detection; in a case where a channel is detected to be idle in the beam direction after switching, performing the transmission of the information by using the beam direction after switching; and in a case where the channel is detected to be busy, switching the beam direction, and using the preceding processing mode;

reattempting, by the equipment, a CCA/LBT detection by using an original beam direction at a next information position or an information position after a first attempt of transmission of all information to be transmitted is completed; in a case where a channel is detected to be idle on the original beam at the current information position, performing, by the equipment, the transmission of the information at the current information position by using the original beam direction; and in a case where a detection to the channel fails, in next retransmission of the information, reattempting a CCA/LBT detection by using the original beam direction at a next information position or a position after retransmission of the information to be retransmitted is completed once, and using the preceding processing mode;

reattempting, by the equipment, a CCA/LBT detection at a specific frequency domain position of a next information position by using an original beam direction; in a case where a channel is detected to be idle, performing, by the equipment, the transmission of the information at the specific frequency domain position by using the original beam direction; and in a case where a detection to the channel fails, using the preceding processing mode;

reattempting, by the equipment, CCAs/LBT detections at a plurality of frequency domain positions of a next information position by using an original beam direction; in case where a CCA/LBT succeeds within an original beam at at least one of the plurality of frequency domain positions, performing, the equipment, the transmission of the information at the at least one of the plurality of frequency domain positions by using the original beam; and in a case where a detection to a channel fails within a beam at none of the plurality of frequency domain positions, using the preceding processing mode;

attempting, by the equipment, CCAs/LBT detections at a plurality of frequency domain positions of a next information position by using a plurality of beam directions; in a case where a CCA/LBT detection succeeds within at least one of a plurality of beams at at least one of the plurality of frequency domain positions, performing, by the equipment, the transmission of the information at the at least one of the plurality of frequency domain positions by using the at least one of the plurality of beams where a channel is detected to be idle; and in a case where a frequency domain position and/or a beam direction where a channel is detected to be idle does not exist, using the preceding processing mode; or performing, by the equipment, CCAs/LBT detections simultaneously by using a plurality of beam directions at a next information position or an information position after a first attempt of transmission of all information to be transmitted is completed; in a case where a channel is detected to be idle in at least one of the plurality of beam directions, performing, by the equipment, the transmission of the information at the current information position by using at least one of the at least one of the plurality of beams detected to be idle; and in a case where a beam where a channel is detected to be idle does not exist, using the preceding processing mode.

7. The information transmission method of claim 1, wherein for consecutive information positions or information positions within a max channel occupy time (MCOT)/time window, a CCA/LBT detection comprises at least one of:

performing, by an equipment, a CCA/LBT detection before the consecutive information positions or the MCOT/time window;

between the consecutive information positions, or between the consecutive information positions or information positions within the MCOT/time window, performing, by an equipment, no CCA/LBT detection, or performing a simplified CCA/LBT detection, or transmitting an occupancy signal at a gap between the information positions; or requiring an equipment to perform CCAs/LBT detections at the consecutive information positions or information positions outside the MCOT.

8. The information transmission method of claim 1, wherein for consecutive information transmission, in a case where an equipment performs the transmission at consecutive information positions by using a same beam direction or similar beam directions, the information transmission method comprises at least one of:
performing, by the equipment, a CCA/LBT detection in a specific beam direction before a first information position of consecutive transmission; in a case where a channel is detected to be idle, performing the transmission at consecutive information positions by using the beam direction; in a case where the channel is detected to be busy, performing a CCA/LBT detection in a previous beam direction before a next information position of the consecutive transmission, processing rest by using the preceding processing mode;
performing, by the equipment, a CCA/LBT detection in a specific beam direction before a first information position of the consecutive transmission; in a case where a channel is detected to be idle, performing the transmission at consecutive information positions by using the beam direction; in a case where the channel is detected to be busy, performing a CCA/LBT detection in a beam direction after switching before a next information position of the consecutive transmission, and using the preceding processing mode; or
performing, by the equipment, CCAs/LBT detections simultaneously in a plurality of beam directions before a first information position of the consecutive transmission; in a case where at least one beam where a channel is detected to be idle exists, performing the transmission of the information at consecutive information positions by using at least one of the at least one beam direction detected to be idle; in a case where a beam where a channel is detected to be idle does not exist, abandoning the transmission of the information at a current position; and re-performing CCAs/LBT detections in the plurality of beam directions before a next information position of the consecutive transmission, and using the preceding processing mode.

9. The information transmission method of claim 7, wherein in a case of using different beam directions at consecutive information positions, a calculation mode of a received energy comprises at least one of:
using a sum of detected energies in respective beam directions as the received energy;
using an average of detected energies in respective beam directions as the received energy;
using a maximum value among detected energies within respective beams as the received energy; or
using a minimum value among detected energies within respective beams as the received energy;
wherein the calculation mode of a received energy is used to determine whether a current channel is idle and available.

10. The information transmission method of claim 1, wherein in a case of using different beam directions at consecutive information positions, a beam direction of information transmission comprises at least one of:
an original beam direction corresponding to an information position;
a beam direction having a best channel state;
a beam direction having a suboptimal channel state or a middle interference;
a beam corresponding to an union of respective beams; or
a beam corresponding to an intersection of respective beams.

11. The information transmission method of claim 1, wherein the information comprises at least one of:
a synchronization signal/physical broadcast channel block (SS/PBCH block), a physical uplink shared channel, a physical downlink shared channel, a physical uplink control channel, a physical downlink control channel, an uplink or downlink reference signal, an Msg message in a random access process, or Paging.

12. The information transmission method of claim 1, wherein in a case where the information is an SS/PBCH block increasing an occasion of SS/PBCH block transmission comprises one of:
increasing a number of SS/PBCH block positions within a time window for the SS/PBCH block transmission;
increasing a length of a time window for the SS/PBCH block transmission;
introducing a short period of the SS/PBCH block transmission into an SSB burst set; or
configuring a plurality of SS/PBCH block positions in frequency domain.

13. The information transmission method of claim 1, wherein at least one of the time domain position of the information, the frequency domain position of the information, the spatial position of the information, a time domain pattern of the information, a start position of the information in time domain, a size of a time window for information transmission, a parameter for determining the time domain position/time domain pattern of the information, a start position of the information in frequency domain, a number of repetition times of transmission in frequency domain, a start point of an SS/PBCH block resource cluster, an end point of a cluster, a size of a cluster, an LBT position, an LBT mechanism, or an indication for performing an LBT is determined/acquired through at least one of following modes: predefinition, physical layer downlink control information (DCI) signaling, high layer radio resource control (RRC) signaling, media access control (MAC) signaling or a bitmap.

14. An information transmission apparatus, comprising:
a memory, a processor and a computer program stored in the memory and executable by the processor, wherein the processor, when executing the computer program, implements:
determining at least one of a time domain position, a frequency domain position or a spatial domain position for transmitting information, wherein the information comprises a signal and/or a channel; and
performing transmission of the information at the determined at least one of the time domain position, the frequency domain position or the spatial domain position for transmitting the information;
wherein enabling an SS/PBCH block to satisfy a requirement for an occupied channel bandwidth in an unlicensed spectrum in frequency domain comprises at least one of:
transmitting the SS/PBCH block as a whole for multiple times;
transmitting the SS/PBCH block as a whole alternately with remaining minimum system information (RMSI) in the frequency domain;
transmitting the SS/PBCH block as a whole and RMSI respectively for multiple times in the frequency domain;

multiplexing and transmitting the SS/PBCH block and a downlink channel/signal in a manner of frequency division multiplexing (FDM); or transmitting the SS/PBCH block in the frequency domain by using a resource element (RE)-level resource allocation mode; and wherein the RE-level resource allocation mode of the SS/PBCH block comprises one of:

assuming that a bandwidth is B1 and corresponds to B2 resource blocks (RBs) and B2*12 subcarriers, dividing the B2*12 subcarriers into P1 clusters, wherein each cluster comprises B2*12/P1 subcarriers, each of the P1 clusters comprises 240/P1 SS/PBCH block positions, and the SS/PBCH block is mapped at a position having a corresponding number in each of the P1 cluster.

15. A non-transitory computer-readable storage medium, wherein the computer-readable storage medium stores one or more programs, and the one or more programs are executable by one or more processors to implement:

determining at least one of a time domain position, a frequency domain position or a spatial domain position for transmitting information, wherein the information comprises a signal and/or a channel; and performing transmission of the information at the determined at least one of the time domain position, the frequency domain position or the spatial domain position for transmitting the information;

wherein enabling an SS/PBCH block to satisfy a requirement for an occupied channel bandwidth in an unlicensed spectrum in frequency domain comprises at least one of:

transmitting the SS/PBCH block as a whole for multiple times;

transmitting the SS/PBCH block as a whole alternately with remaining minimum system information (RMSI) in the frequency domain;

transmitting the SS/PBCH block as a whole and RMSI respectively for multiple times in the frequency domain;

multiplexing and transmitting the SS/PBCH block and a downlink channel/signal in a manner of frequency division multiplexing (FDM); or transmitting the SS/PBCH block in the frequency domain by using a resource element (RE)-level resource allocation mode; and wherein the RE-level resource allocation mode of the SS/PBCH block comprises one of:

assuming that a bandwidth is B1 and corresponds to B2 resource blocks (RBs) and B2*12 subcarriers, dividing the B2*12 subcarriers into P1 clusters, wherein each cluster comprises B2*12/P1 subcarriers, each of the P1 clusters comprises 240/P1 SS/PBCH block positions, and the SS/PBCH block is mapped at a position having a corresponding number in each of the P1 cluster.

* * * * *